(12) United States Patent
Chen et al.

(10) Patent No.: US 11,829,599 B2
(45) Date of Patent: *Nov. 28, 2023

(54) SCREEN DISPLAY CONTROL METHOD AND ELECTRONIC DEVICE

(71) Applicant: Huawei Technologies Co., Ltd., Shenzhen (CN)

(72) Inventors: Xiaoxiao Chen, Nanjiing (CN); Wei Zhao, Shenzhen (CN); Xiuming Yuan, Wuhan (CN); Qingyu Cui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,861

(22) Filed: Mar. 16, 2023

(65) Prior Publication Data

US 2023/0221861 A1    Jul. 13, 2023

Related U.S. Application Data

(63) Continuation of application No. 17/409,604, filed on Aug. 23, 2021, now Pat. No. 11,630,577, which is a
(Continued)

(30) Foreign Application Priority Data

Feb. 22, 2019   (CN) .......................... 201910134248.X

(51) Int. Cl.
*G06F 3/041*        (2006.01)
*G06F 3/0488*       (2022.01)
(Continued)

(52) U.S. Cl.
CPC ........ *G06F 3/04886* (2013.01); *G06F 1/1652* (2013.01); *G06F 3/0412* (2013.01);
(Continued)

(58) Field of Classification Search
CPC .... G06F 3/0412; G06F 3/0416; G06F 3/0487; G06F 3/0488; G06F 3/04886;
(Continued)

(56) References Cited

U.S. PATENT DOCUMENTS

2010/0302179 A1* 12/2010 Ahn .................. H04M 1/72403
345/173
2013/0021265 A1* 1/2013 Selim .................. G06F 3/04883
345/173
(Continued)

FOREIGN PATENT DOCUMENTS

CN         105224273 A     1/2016
CN         107645611 A     1/2018
(Continued)

OTHER PUBLICATIONS

Chen, S., et al., "Folding state recognition for multi-foldable mobile devices," SoutheastCon, Mar. 30-Apr. 2, 2017, 2 pages.
(Continued)

*Primary Examiner* — Ryan A Lubit
(74) *Attorney, Agent, or Firm* — Conley Rose, P.C.

(57) ABSTRACT

A screen display control method may be implemented by an electronic device configured with a foldable touchscreen. The touchscreen includes a first area and a second area. A first interface is displayed in a first area and a first operation is detected in a first interface. A second interface is displayed in a second area in response to the first operation and the second interface is associated with content displayed in the first interface.

20 Claims, 26 Drawing Sheets

Display interface of an area 301

Display interface of an area 302

Related U.S. Application Data continuation of application No. PCT/CN2020/075034, filed on Feb. 13, 2020.

(51) Int. Cl.
  *G06F 3/04886* (2022.01)
  *G06F 1/16* (2006.01)
  *G06Q 20/32* (2012.01)
  *H04M 1/02* (2006.01)

(52) U.S. Cl.
  CPC .......... *G06F 3/0414* (2013.01); *G06F 3/0416* (2013.01); *G06F 3/0488* (2013.01); *G06Q 20/3274* (2013.01); *H04M 1/0268* (2013.01); *G06F 2203/04102* (2013.01)

(58) Field of Classification Search
  CPC .... G06F 1/1618; G06F 1/1641; G06F 1/1643; G06F 1/1652; G06F 1/1677; G06F 1/1694; G06F 1/3218; G06F 1/3265; G06F 1/3287; G06F 2203/04102; G06F 2203/04803
  See application file for complete search history.

(56) References Cited

U.S. PATENT DOCUMENTS

| | | | | |
|---|---|---|---|---|
| 2014/0218321 | A1* | 8/2014 | Lee | G06F 1/1677 345/173 |
| 2015/0347389 | A1* | 12/2015 | Lee | G06F 40/242 704/2 |
| 2015/0378395 | A1 | 12/2015 | Manning | |
| 2016/0179236 | A1* | 6/2016 | Shin | H04M 1/0216 345/173 |
| 2016/0299590 | A1* | 10/2016 | Chen | G06F 1/1626 |
| 2017/0052566 | A1 | 2/2017 | Ka et al. | |
| 2017/0090681 | A1 | 3/2017 | Gao et al. | |
| 2017/0115691 | A1* | 4/2017 | Aurongzeb | G06F 1/1652 |
| 2017/0139496 | A1* | 5/2017 | Kang | G06F 3/0484 |
| 2017/0293391 | A1 | 10/2017 | Jung et al. | |
| 2017/0345397 | A1 | 11/2017 | Tsukamoto et al. | |
| 2018/0242446 | A1 | 8/2018 | Cho et al. | |
| 2018/0336234 | A1 | 11/2018 | Jatzold et al. | |
| 2018/0357223 | A1* | 12/2018 | Kim | G06F 16/00 |
| 2020/0175945 | A1 | 6/2020 | Chen et al. | |
| 2021/0014415 | A1 | 1/2021 | Wei | |
| 2021/0389873 | A1 | 12/2021 | Chen et al. | |

FOREIGN PATENT DOCUMENTS

| | | |
|---|---|---|
| CN | 107766114 A | 3/2018 |
| CN | 108008889 A | 5/2018 |
| CN | 108076292 A | 5/2018 |
| CN | 108227996 A | 6/2018 |
| CN | 108234891 A | 6/2018 |
| CN | 108508967 A | 9/2018 |
| CN | 108566458 A | 9/2018 |
| CN | 109101149 A | 12/2018 |
| CN | 109144351 A | 1/2019 |
| CN | 109246360 A | 1/2019 |
| CN | 109917956 A | 6/2019 |
| KR | 20100128781 A | 12/2010 |
| KR | 20150014807 A | 2/2015 |
| KR | 101526046 B1 | 6/2015 |
| KR | 101727894 B1 | 4/2017 |
| RU | 84613 U1 | 7/2009 |
| WO | 2018191900 A1 | 10/2018 |

OTHER PUBLICATIONS

ITU-T H.264, Apr. 2017, "Series H: Audiovisual and Multimedia Systems, Infrastructure of audiovisual services—Coding of moving video, Advanced video coding for generic audiovisual services," 812 pages.

Kungang, H., "Smartphone black technology that is about to become popular," Popular Utilization of Electricity, Issue 08, 2017, with an English translation version, 2 pages.

* cited by examiner

Display interface of an area 301      Display interface of an area 302

Display interface of an area 301     Display interface of an area 302

Display interface of an area 301    Display interface of an area 302

Display interface of an area 301   Display interface of an area 302

Display interface of an area 301      Display interface of an area 302

Display interface of an area 301     Display interface of an area 302

Display interface of an area 301    Display interface of an area 302

Display interface of an area 301   Display interface of an area 302

Display interface of an area 301   Display interface of an area 302

SCREEN DISPLAY CONTROL METHOD AND ELECTRONIC DEVICE

CROSS-REFERENCE TO RELATED APPLICATIONS

This is a continuation of U.S. patent application Ser. No. 17/409,604 filed on Aug. 23, 2021, which is a continuation of International Patent Application No. PCT/CN2020/075034 filed on Feb. 13, 2020, which claims priority to Chinese Patent Application No. 201910134248.X filed on Feb. 22, 2019. All of the aforementioned patent applications are hereby incorporated by reference in their entireties.

TECHNICAL FIELD

This disclosure relates to the field of electronic devices, and more specifically, to a screen display control method and an electronic device.

BACKGROUND

At present, increasingly more users are chasing a visual effect of mobile phones. Therefore, screens of the mobile phones become larger. However, large-screen devices also have some problems, such as being not easy to carry. In this case, foldable electronic devices are ready to come. When in use, a foldable screen may be switched to an unfolded state or a folded state. When carried, the foldable screen is switched to the folded state to reduce space occupation.

However, when the foldable screen is folded, only a screen part that faces a user is turned on, and back and side screen parts are turned off. Consequently, use of the screen is not maximized.

SUMMARY

Embodiments of this application provide a screen display control method and an electronic device, to help improve screen utilization.

According to a first aspect, a screen display control method is provided. The method is applied to an electronic device configured with a foldable touchscreen. The touchscreen includes a first area and a second area. The method includes: The electronic device displays a first interface in the first area. The electronic device detects a first operation in the first interface. The electronic device displays a second interface in the second area in response to the first operation. The second interface is associated with content displayed in the first interface.

In this embodiment of this application, after detecting a user operation in the first area, the electronic device may display content associated with the second area in the second area, thereby helping improve screen utilization and improving user experience.

In some possible implementations, the electronic device may be in a folded form. In this case, the electronic device displays the first interface in the first area, and the second area is turned off for no display. After the electronic device detects the first operation in the first area, the electronic device turns on the second area, and displays the second interface in the second area.

In some possible implementations, the electronic device may be in an unfolded form or a half-folded form. In this case, the electronic device may display the first interface in the first area, and the second area is turned off for no display, or the second area displays a third interface. After the electronic device detects the first operation in the first area, the electronic device turns on the second area, and displays the second interface in the second area, or the electronic device switches the third interface displayed in the second area to the second interface.

With reference to the first aspect, in some possible implementations of the first aspect, that the electronic device displays a first interface in the first area includes: The electronic device determines that the electronic device is in a folded form. The electronic device displays the first interface in the first area in response to being in the folded form, and the electronic device turns off the second area.

In this embodiment of this application, when the electronic device determines that the electronic device is in the folded form, the electronic device may display content in the first area and turn off the second area for no display. After detecting a user operation in the first area, the electronic device turns on the second area, and displays the second interface in the second area. This helps improve screen utilization in the folded form and also improves user experience.

With reference to the first aspect, in some possible implementations of the first aspect, after the electronic device displays the second interface in the second area, the method further includes: The electronic device detects a second operation in the first interface. The electronic device turns off the second area in response to the second operation.

In this embodiment of this application, when a user expects to exit cooperative work between the first area and the second area, the user may perform a corresponding operation in the first area to exit the cooperative work between the first area and the second area, and turn off the second area. This helps reduce power consumption of the electronic device, and also helps improve user experience.

In some possible implementations, after the electronic device displays the second interface in the second area, the method further includes: The electronic device detects a second operation in the second interface. The electronic device turns off the second area in response to the second operation.

In this embodiment of this application, alternatively, after a user operation is detected in the second interface, the cooperative work between the first area and the second area may be exited, and the second area may be turned off.

With reference to the first aspect, in some possible implementations of the first aspect, content displayed in the second interface is at least partially the same as the content displayed in the first interface.

With reference to the first aspect, in some possible implementations of the first aspect, the first interface is a camera interface, the camera interface includes a first preview window, the second interface includes a second preview window, and images displayed in the first preview window and the second preview window are at least partially the same.

The screen display control method in this embodiment of this application may be applied to a shooting scenario. After detecting a user operation in the camera interface, the electronic device may display the second preview window in the second area. This can help a photographed person adjust a posture of the photographed person in time, and allow the user to take a satisfactory photo or video while improving screen utilization, thereby helping improve user experience.

With reference to the first aspect, in some possible implementations of the first aspect, the first interface is a payment interface of a user, the payment interface includes a payment code, and the second interface includes the payment code.

The screen display control method in this embodiment of this application may be applied to a payment scenario. When a user pays by using a barcode or a two-dimensional code, the barcode or the two-dimensional code may be displayed in the second area, thereby helping improve screen utilization. In addition, the user does not need to flip the electronic device, thereby facilitating scanning by a merchant, and helping improve user experience.

With reference to the first aspect, in some possible implementations of the first aspect, the first interface is a translation interface, the translation interface includes to-be-translated content, and the second interface includes a translation result of the to-be-translated content.

The screen display control method in this embodiment of this application may be applied to a translation scenario. After a user completes translation of to-be-translated content, translated content may be displayed in the second area, thereby helping improve screen utilization. In addition, this can improve efficiency of communication in a foreign language by the user, thereby improving user experience.

With reference to the first aspect, in some possible implementations of the first aspect, the first interface includes the translation result, and the method further includes: The electronic device detects a modification operation performed by the user on the translation result in the first interface. The electronic device displays a modified translation result in the second interface in response to the modification operation.

According to the screen display control method in this embodiment of this application, when determining that to-be-translated content is not inaccurately translated in a translation app, the user may adjust translated content in the first area, and display an accurate translation result in the second area, thereby helping improve user experience.

According to a second aspect, this technical solution provides an apparatus for controlling screen display. The apparatus is included in an electronic device. The apparatus has a function of implementing behavior of the electronic device in the foregoing aspect and the possible implementations of the foregoing aspect. The function may be implemented by hardware, or may be implemented by hardware by executing corresponding software. The hardware or software includes one or more modules or units corresponding to the foregoing function, for example, a display module or unit, or a detection module or unit.

According to a third aspect, this technical solution provides an electronic device, including a foldable touchscreen, one or more processors, a memory, a plurality of applications, and one or more computer programs. The one or more computer programs are stored in the memory, and the one or more computer programs include instructions. When the instructions are executed by the electronic device, the electronic device is enabled to perform the screen display control method in any possible implementation of the foregoing aspects.

According to a fourth aspect, this technical solution provides an electronic device, including one or more processors and one or more memories. The one or more memories are coupled to the one or more processors. The one or more memories are configured to store computer program code. The computer program code includes computer instructions. When the one or more processors execute the computer instructions, the electronic device performs the screen display control method in any possible implementation of the foregoing aspects.

According to a fifth aspect, this technical solution provides a computer storage medium, including computer instructions. When the computer instructions are run on an electronic device, the electronic device is enabled to perform the screen display control method in any possible implementation of the foregoing aspects.

According to a sixth aspect, this technical solution provides a computer program product. When the computer program product is run on an electronic device, the electronic device is enabled to perform the screen display control method in any possible design of the foregoing aspects.

DESCRIPTION OF EMBODIMENTS

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms like "one or more", unless otherwise specified in the context clearly. It should be further understood that, in the following embodiments of this application, "at least one" or "one or more" means one, two, or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, but mean "one or more but not all of the embodiments", unless otherwise specified. The terms "include", "comprise", "have", and their variants all mean "include but are not limited to", unless otherwise specified.

The following describes an electronic device with an NFC function, a user interface used for such an electronic device, and embodiments used for using such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop computer (Laptop). It should be further understood that, in some other embodiments, the electronic device may alternatively be a desktop computer, but not a portable electronic device.

Figure 1:
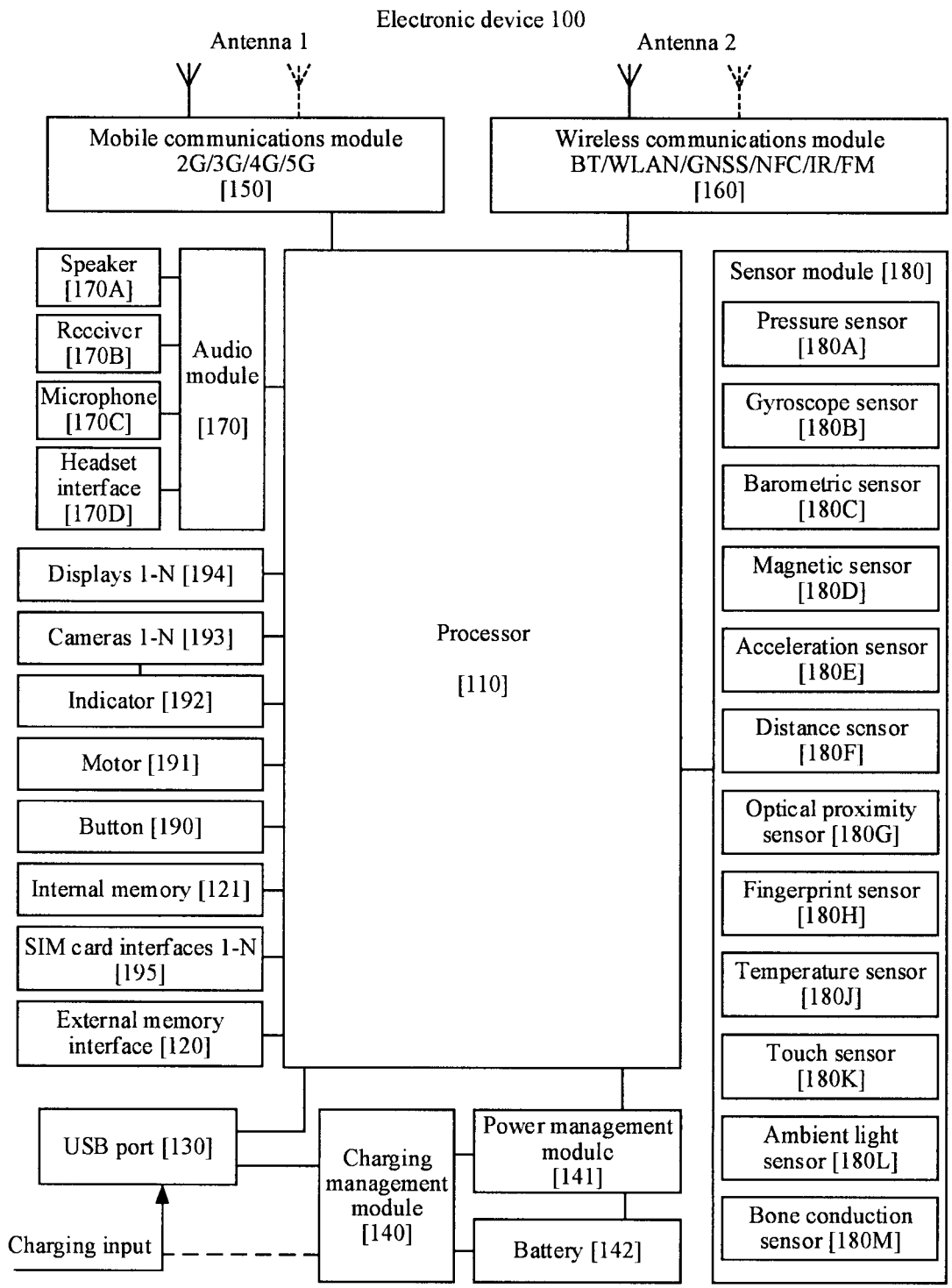
FIG. 1 is a schematic diagram of a hardware structure of an electronic device according to an embodiment of this application.

For example, FIG. 1 is a schematic structural diagram of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors. In some embodiments, the electronic device 101 may alternatively include one or more processors 110. The controller may generate an operation control signal based on instruction operation code and a time sequence signal, to control to read instructions and execute instructions. In some other embodiments, a memory may be further disposed in the processor 110, and is configured to store instructions and data. For example, the memory in the processor 110 may be a cache memory. The memory may store instructions or data that has just been used or is cyclically used by the processor 110. If the processor 110 needs to use the instructions or the data again, the processor 110 may directly invoke the instructions or the data from the memory, to avoid repeated access. This reduces a waiting time of the processor 110, and improves efficiency of processing data or executing instructions by the electronic device 101.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a SIM card interface, a USB port, and/or the like. The USB port 130 is a port that conforms to a USB standard specification, and may be specifically a mini USB port, a micro USB port, a USB Type C port, or the like. The USB port 130 may be configured to connect to the charger to charge the electronic device 101, or may be configured to transmit data between the electronic device 101 and a peripheral device, or may be configured to connect to a headset to play audio by using the headset.

It may be understood that an interface connection relationship between the modules shown in the embodiments is merely used as an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as battery power, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution, for example, including 2G/3G/4G/5G wireless communication, that is applied to the electronic device 100. The mobile communications module 150 may include at least one filter, a switch, a power amplifier, a low-noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a Wi-Fi network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

The electronic device 100 implements a display function by using the GPU, the display 194, the application processor, and the like. The GPU is a microprocessor for image processing, and connects the display 194 to the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (flex light-emitting diode, FLED), mini-LED, a micro-LED, a micro-OLED, a quantum dot light-emitting diode (quantum dot light-emitting diodes, QLED), or the like In some embodiments, the electronic device 100 may include one or more displays 194.

In some embodiments of this application, when the display panel is made of a material such as an OLED, an AMOLED, or an FLED, the display 194 shown in FIG. 1 may be folded. Herein, that the display 194 may be folded means that the display may be folded to any angle at any part and may be maintained at the angle. For example, the display 194 may be folded left and right from the center, or may be folded up and down from the middle. In this application, the display that may be folded is referred to as a foldable display. The foldable display may include one screen, or may be a display formed by combining a plurality of screens. This is not limited herein.

The display 194 of the electronic device 100 may be a flexible display. Currently, the flexible display attracts much attention due to its unique features and huge potential. Compared with a conventional screen, the flexible display has features of strong flexibility and bendability, and can provide a user with a new interaction manner based on the feature of bendability, to meet more requirements of the user for the electronic device. For an electronic device provided with a foldable display, the foldable display on the electronic device may be switched between a small screen in a folded form and a large screen in an expanded form at any time. Therefore, the user also uses a screen splitting function on the electronic device configured with the foldable display more frequently.

Because the display 194 may be folded, a physical form of the electronic device may also change accordingly. For example, when the display is fully expanded, a physical form of the electronic device may be referred to as an unfolded form. When some areas of the touchscreen are folded, a physical form of the electronic device may be referred to as a folded form. It may be understood that in the following embodiments of this application, a physical form of the electronic device may refer to a physical form of the touchscreen.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of coding formats, for example, MPEG (moving picture experts group, MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. The electronic device 100 may implement intelligent cognition such as image recognition, facial recognition, speech recognition, and text understanding through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function, for example, to store files such as music and a video in the external memory card.

The internal memory 121 may be configured to store one or more computer programs, where the one or more computer programs include instructions. The processor 110 may run the instructions stored in the internal memory 121, so that the electronic device 101 performs the always on display method provided in some embodiments of this application, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device 101. In addition, the internal memory 121 may include a high-speed random-access memory (RAM), or may include a nonvolatile memory, for example, at least one magnetic disk storage device, a flash memory device, or a universal flash storage (UFS). In some embodiments, the processor 110 may run the instructions stored in the internal memory 121 and/or instructions stored in a memory disposed in the processor 110, so that the electronic device 101 performs the always on display method provided in the embodiments of this application, other applications, data processing, and the like.

The electronic device 100 may implement audio functions, for example, music playing and recording, by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during shooting. For example, when the shutter is pressed, the gyroscope sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario.

In the embodiments of this application, an included angle between the displays may also be determined by using the gyroscope sensor 180B on each screen after the electronic device is folded.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to applications such as a pedometer and switching between a landscape mode and a portrait mode.

The distance sensor 180F is configured to measure a distance. The electronic device 100 may measure the distance in an infrared or a laser manner. In some embodiments, in a shooting scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call. In this case, the electronic device 100 automatically turns off the screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation acting on or near the touch sensor 180K. The touch sensor may transfer the detected touch operation to the application processor, to determine a type of a touch event. The display 194 provides a visual output related to the touch operation. In some other embodiments, the touch sensor 180K may alternatively be disposed on a surface of the electronic device 100 in a position different from that of the display 194.

It should be understood that the foregoing merely shows some sensors in the electronic device 100 and functions of the sensors. The electronic device may include more or fewer sensors. For example, the electronic device 100 may further include a gravity sensor. In the embodiments of this application, a foldable electronic device may include a first area and a second area that form a particular angle in a foldable form. The electronic device may determine a folding direction of the electronic device and an included angle between the first area and the second area by using an acceleration sensor and a gravity sensor after folding.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different use scenarios (for example, a time reminder, information receiving, an alarm clock, and a game) may also correspond to different vibration feedback effects. A touch vibration feedback effect may alternatively be customized.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
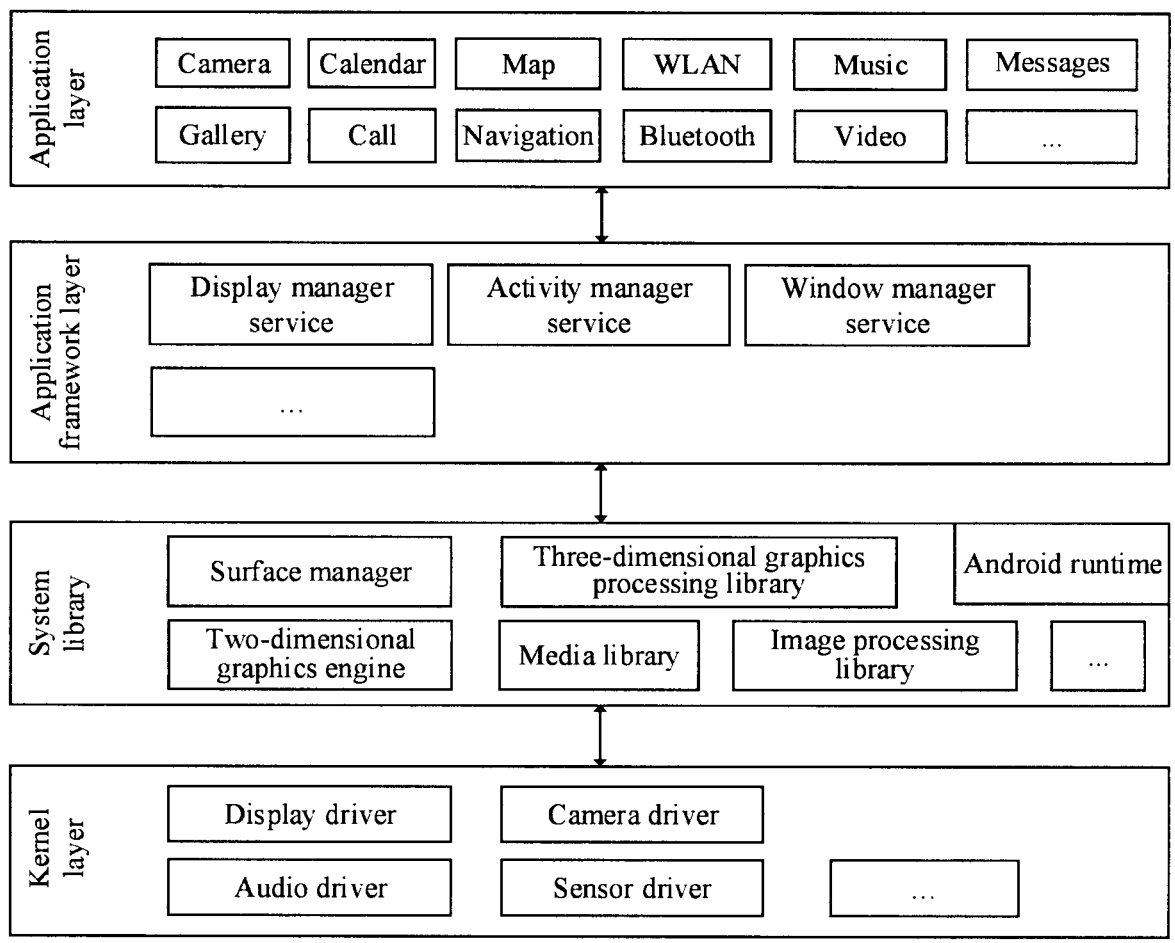
FIG. 2 is a schematic diagram of a software structure of an electronic device according to an embodiment of this application.

FIG. 2 is a block diagram of a software structure of an electronic device 100 according to an embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as "camera", "gallery", "calendar", "calls", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

As shown in FIG. 2, the application framework layer may include a display manager service, an activity manager service, a window manager service, and the like.

For a foldable electronic device, after a user folds a touchscreen of the electronic device (it is assumed that the touchscreen may be folded once), the screen may be divided into a screen A and a screen B. It is assumed that the electronic device controls the screen A to be turned on to continue working, and the screen B is turned off for no work. When the user holds the electronic device, the screen A may be turned on, and the user may perform a corresponding operation on the screen A. The screen B is turned off. Therefore, the user does not need to perform any operation on the screen B.

The display management service is used to: after the electronic device detects an operation that the user triggers the screen A and the screen B to enter a cooperative working mode, adjust an actual display area of the screen to a size of the screen A and the screen B, so that another application interface can be displayed on the screen B.

The activity management service is used to start the application interface on the screen B when the screen A and the screen B enter the cooperative working mode.

The window management service is used to adjust positions of the application interfaces on the screen A and the screen B on the unfolded screen when the screen A and the screen B enter the cooperative working mode.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library (media libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, physical components related to the electronic device 100 mainly include hardware components such as a sensor, a decision support system (decision support systems, DSS) display chip, and a touchscreen, and application framework layer functions such as a display manager service, an activity manager service, and a window manager service.

The following describes, by way of example, a working procedure of software and hardware of the electronic device 100 with reference to a screen display control method in the embodiments of this application.

The screen display control method provided in the embodiments of this application is mainly implemented by cooperation between a touch panel (TP) module, one or more of the foregoing physical components, and layers of a software architecture layer of the electronic device 100.

In this embodiment of this application, the foldable electronic device may include a primary screen, a side screen, and a sub screen. The primary screen and the sub screen may be folded by using the side screen as an axis. When the electronic device is in a folded state, and the folded state may be that the primary screen and the sub screen are folded in opposite directions, if the electronic device is in a non-lock screen state, the electronic device controls the primary screen to be turned on, and controls the sub screen to be turned off for no play.

For example, a total resolution of the foldable electronic device may be 2480*2200. The electronic device may be divided into the primary screen and the sub screen in a folded form. A resolution of the primary screen may be 2480*1144 (19.5:9). A resolution of the sub screen may be 2480*892 (25:9). A resolution of the side screen may be 2480*160.

When the electronic device is in an unfolded form, the display manager service may notify the LCD module of an area (for example, 2480*2200) that currently needs to be turned on, and the LCD module controls the entire touchscreen to be turned on.

When the electronic device is in the folded form, the display manager service may notify the LCD module of an area (for example, 2480*1144) that currently needs to be turned on, and the LCD module controls the primary screen to be turned on, and controls the sub screen to be turned off and not to work.

In this embodiment of this application, when the electronic device is in the folded form, the TP module may receive a tap operation of a user on the primary screen, and transfer the tap operation of the user to the display manager service at the application framework layer. The display manager service may notify the LCD module of an area that needs to be turned on, and the LCD module adjusts an actual display area of the touchscreen to a size of the entire touchscreen, so that an application interface may also be displayed on the sub screen. The activity manager service starts the application interface on the sub screen. The window manager service adjusts display locations of the application interface on the primary screen and the sub screen on the same unfolded touchscreen. Therefore, the primary screen and the sub screen enter a cooperative work mode.

For ease of understanding, in the following embodiments of this application, the electronic device having the structures shown in FIG. 1 and FIG. 2 is used as an example to describe in detail the screen display control method provided in the embodiments of this application with reference to the accompanying drawings and application scenarios.

As described in the background, a touchscreen of an electronic device is becoming larger. To make full use of an application value of the touchscreen, different screen display technologies are correspondingly developed. For example, when the touchscreen is in an unfolded form, a user can simultaneously process a plurality of applications on the same touchscreen. In addition, to improve portability of large-screen mobile phones, flexible screens start to be widely used in electronic devices. Compared with a conventional screen, a flexible screen has features of strong flexibility and bendability, can provide a user with a new interaction manner based on the bendability feature, and can meet more requirements of the user for an electronic device. For an electronic device configured with a touchscreen, the touchscreen on the electronic device may be switched between a small screen in a folded form and a large screen in an unfolded form at any time. Therefore, the user also uses a screen splitting function on the electronic device configured with the touchscreen more frequently.

Figure 3A:
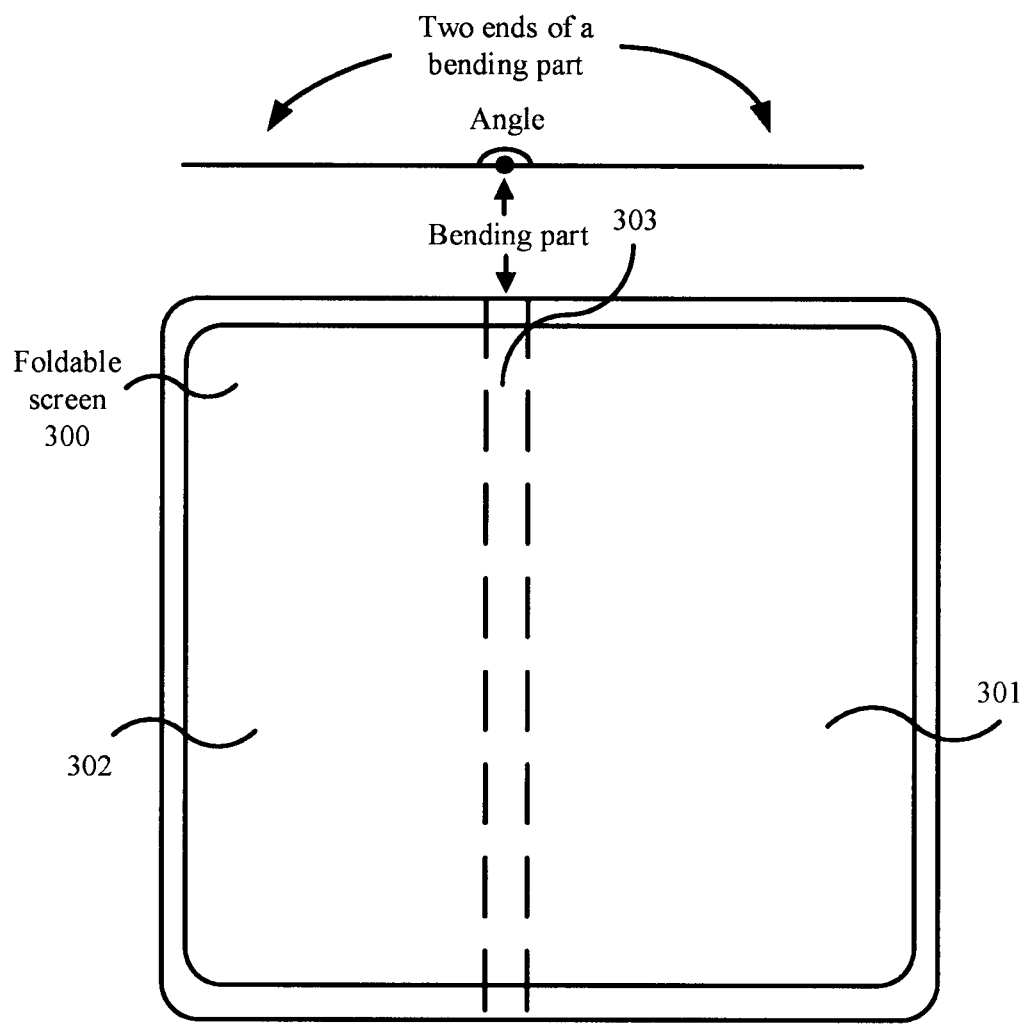
FIG. 3A to FIG. 3D are schematic diagrams of a foldable electronic device according to an embodiment of this application.
Figure 3B:
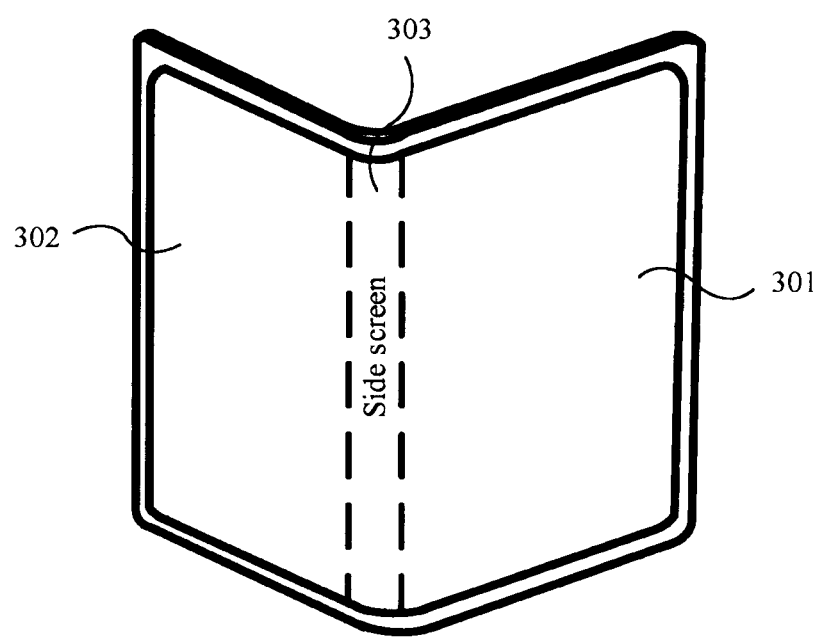
Figure 3C:
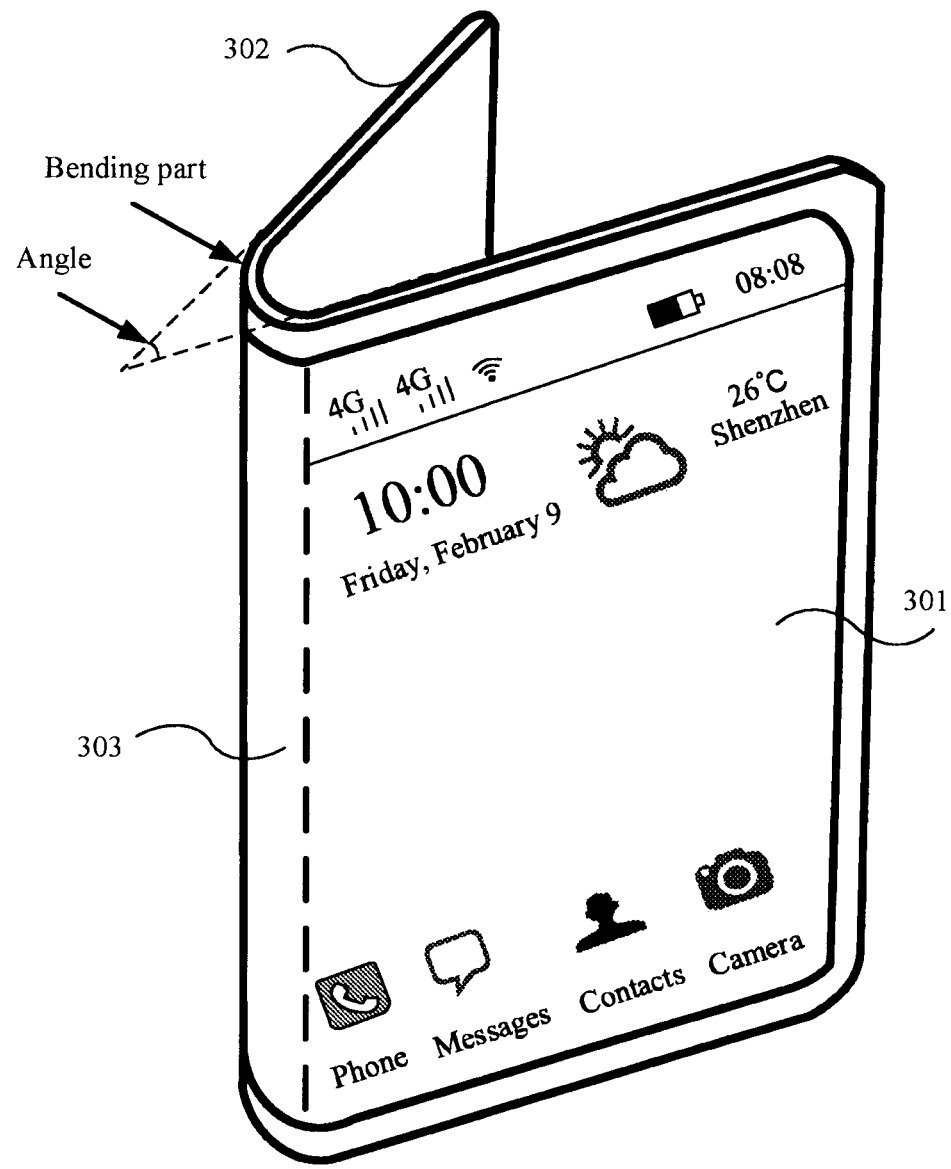

FIG. 3A to FIG. 3D is a schematic diagram of an example of a foldable electronic device according to this application. FIG. 4 is a schematic diagram of division of a physical form of an example of a foldable electronic device according to an embodiment of this application. A touchscreen of the electronic device is first described with reference to FIG. 3A to FIG. 3D and FIG. 4.

In an embodiment of this application, a display area of the touchscreen 300 in a folded form may be divided into three areas: a first area 301, a second area 302, and a third area 303. For example, FIG. 3A to FIG. 3D show at least three physical forms that may be included in the touchscreen 300 of the electronic device: the folded form, a half-folded form in which the touchscreen 300 is folded at a particular angle, and an unfolded form. As shown in FIG. 3A, a middle bending part shown by dotted line boundaries of the touchscreen 300 is the third area 303 described above, and with the third area 303 (or also referred to as a folded side screen) being used as an axis, the touchscreen 300 may be divided into the first area 301 (for example, an area on the right of the area 303 in FIG. 3A to FIG. 3D) and the second area 302 (for example, an area on the left of the area 303 in FIG. 3A to FIG. 3D).

Figure 3D:
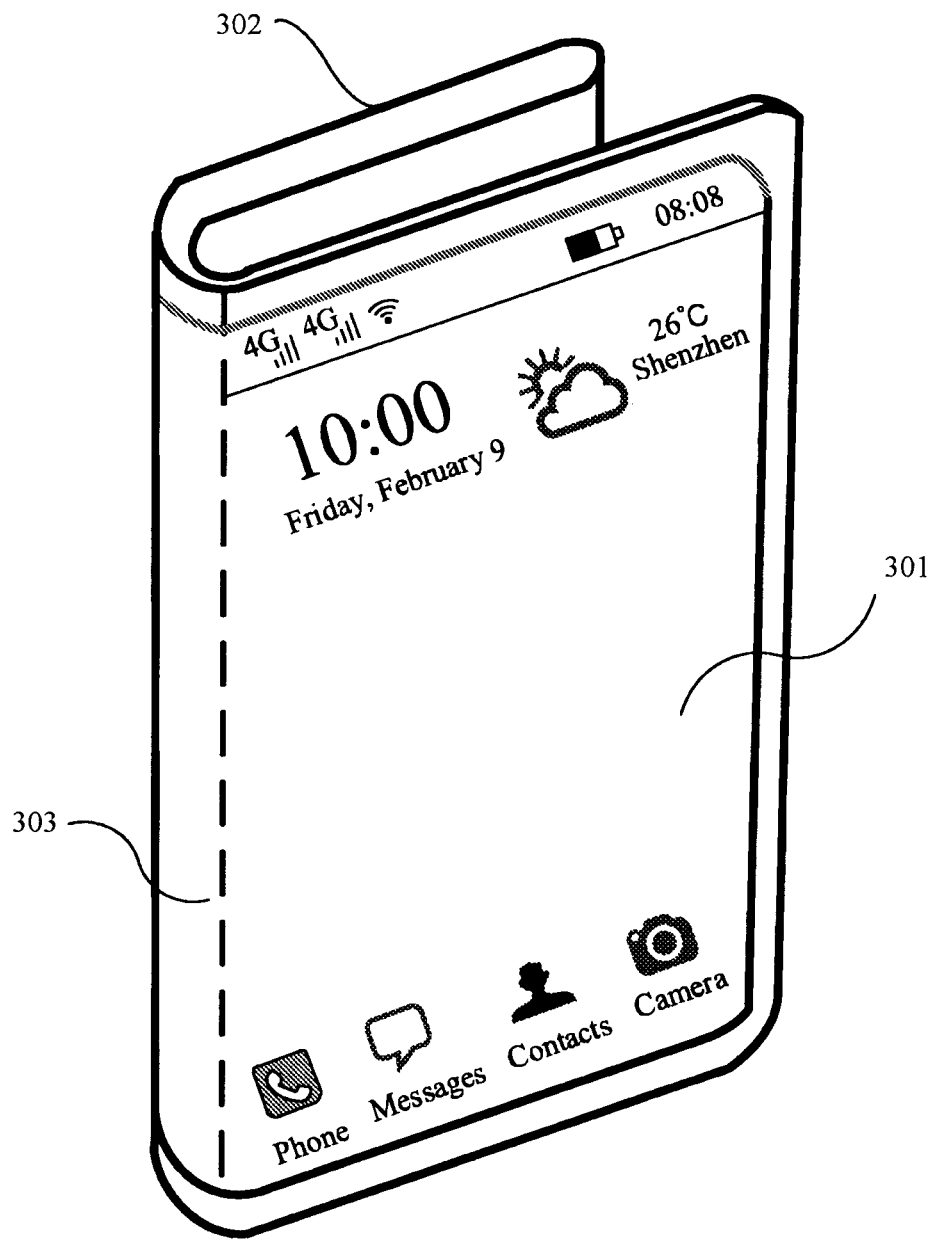
Figure 4:
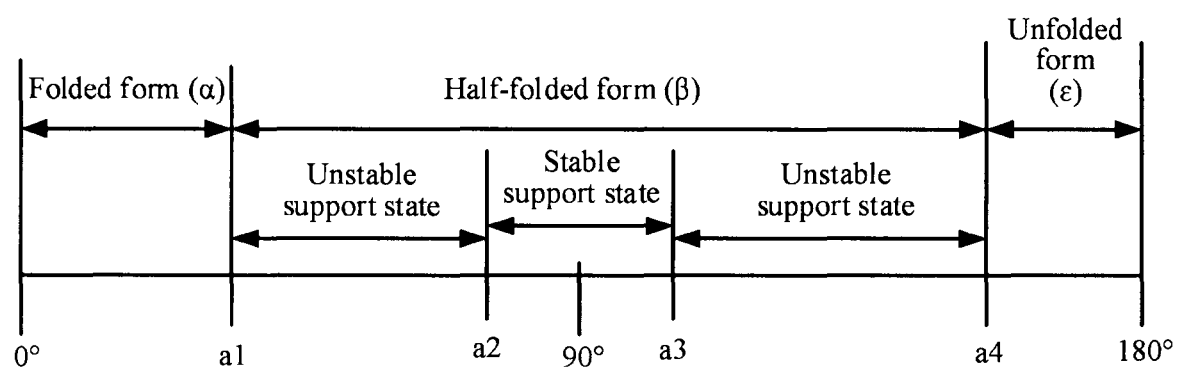
FIG. 4 is a schematic diagram of division of a physical form of a foldable electronic device according to an embodiment of this application.

When in the folded form, the touchscreen 300 of the electronic device 100 may be shown in FIG. 3D. Specifically, in FIG. 3D, in the folded form, an angle between the first area 301 and the second area 302 may be a first angle $\alpha$, where $0° \leq \alpha \leq a_1$, and $a_1$ is less than or equal to 90 degrees and greater than or equal to 0 degrees. For example, $a_1$ may be 25 degrees.

When the touchscreen 300 of the electronic device 100 is in a half-folded form in which the touchscreen 300 is folded at a particular angle, the touchscreen 300 may be shown in FIG. 3C. Specifically, in FIG. 3C, in the half-folded form, an angle between the first area 301 and the second area 302 is a second angle $\beta$, where $a_1 \leq \beta \leq a_4$, $a_1$ is less than or equal to 90 degrees and greater than or equal to 0 degrees, and $a_4$ is greater than or equal to 90 degrees and less than 180 degrees. For example, $a_1$ may be 25 degrees, and $a_4$ may be 155 degrees. In addition, corresponding to division of physical forms of the foldable electronic device in FIG. 4, the half-folded form of the touchscreen 300 may further include an unstable support state and a stable support state. In the stable support state, an angle between the first area 301 and the second area 302 is a second angle $\beta$, and a range of the second angle $\beta$ is $a_2 \leq \beta \leq a_3$, where $a_2$ is less than or equal to 90 degrees and $a_3$ is greater than or equal to 90 degrees and less than 180 degrees. In the half-folded form of the electronic device 100, a form other than the stable support state is the unstable support state of the electronic device 100. It should be understood that division of physical forms of the touchscreen 300 and definitions of the physical forms are not limited in this application.

When the touchscreen 300 of the electronic device is in the unfolded form, the touchscreen 300 may be shown in FIG. 3A or FIG. 3B. Specifically, when the touchscreen 300 is in the unfolded form, an angle between the first area 301 and the second area 302 is a third angle $\varepsilon$, where $a_4 \leq \varepsilon \leq 180$ degrees, and $a_4$ is greater than or equal to 90 degrees and less than 180 degrees. For example, $a_4$ may be 90 degrees. For example, FIG. 3A shows a form when the third angle $\varepsilon$ is 180 degrees, and FIG. 3B shows a form in which the third angle $\varepsilon$ is greater than $a_4$ and less than 180 degrees.

It should be understood that the foregoing provides only an example of classifying the electronic device into an unfolded form, a half-folded state, and a folded form. For example, when the electronic device is in the unfolded form and the half-folded form, the entire touchscreen of the electronic device is working in a turned-on state. When the electronic device is in the folded form, the display manager service may indicate the LCD module to turn on only the primary screen. A manner in which the electronic device determines that the electronic device is in the folded form is not limited in this embodiment of this application, and alternatively, the electronic device may determine, in another manner, that the electronic device is in the folded form.

It should be understood that bending parts may alternatively be horizontally distributed in FIG. 3A, and the foldable screen may be folded up or down. In other words, the first area 301 and the second area 302 of the touchscreen may correspond to an upper end and a lower end of the middle bending part. This application is described by using the first area 301 and the second area 302 that are distributed left and right and that are shown in FIG. 3A as an example. The screen display control method provided in this application is also applicable to a manner in which the touchscreen is folded up or down. This is not limited in this application.

The foregoing describes the physical forms of the electronic device 100. For different physical forms or different types of applications running on the electronic device, a user may expect that the foldable screen 300 has different display modes. The display mode herein may be understood as a display method of the foldable screen 300, for example, full screen display, a method in which display is performed in the first area 301 while the second area 302 is turned off, a method in which display is performed in the second area 302 while the first area 301 is turned off, or a method in which different interfaces are displayed in the first area 301 and the second area 302 simultaneously, or a plurality of other display modes.

FIG. 5A to FIG. 5D are schematic diagrams of a group of graphical user interfaces (graphical user interface, GUI) according to an embodiment of this application.

Figure 5A:
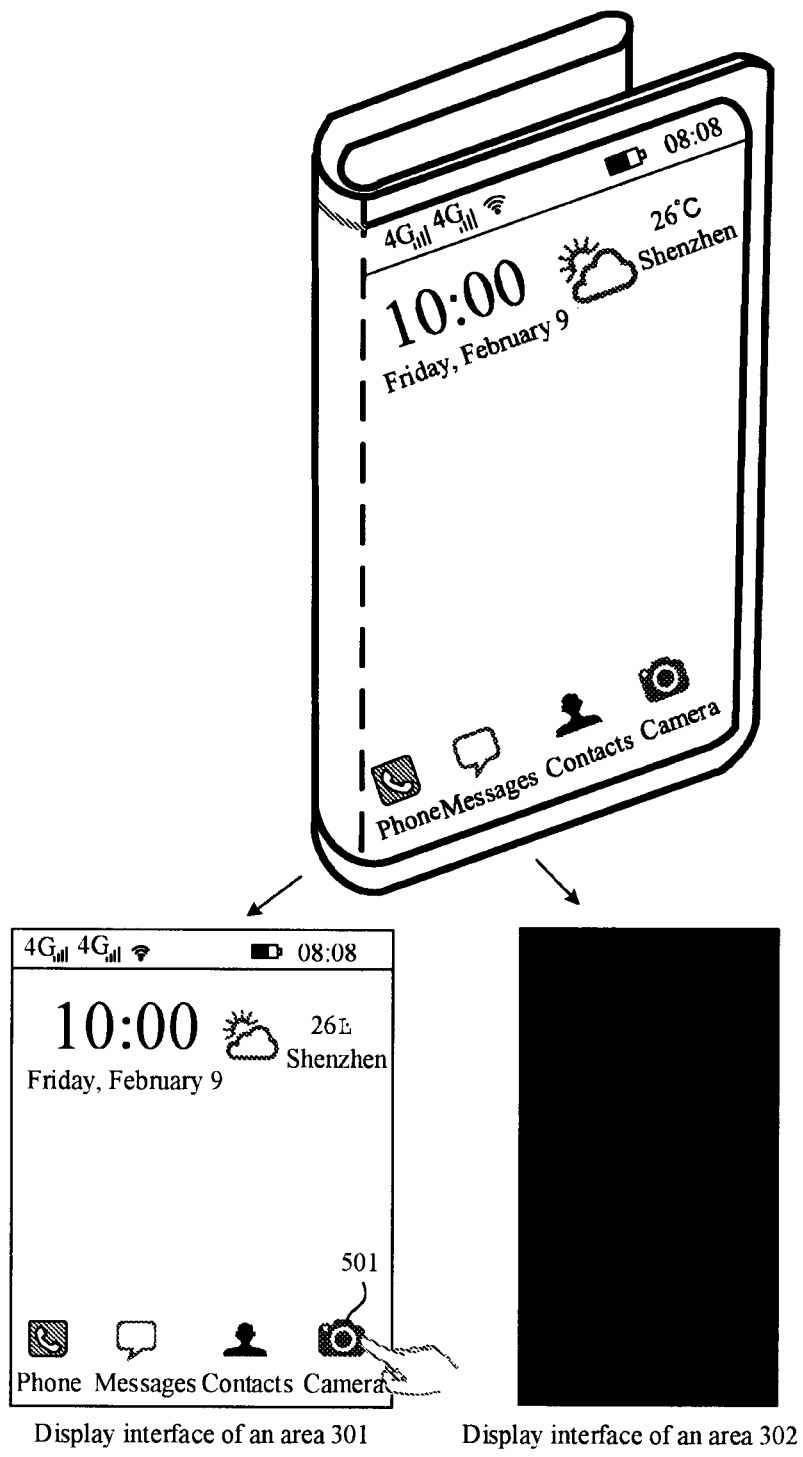
FIG. 5A to FIG. 5D are schematic diagrams of a group of display interfaces according to an embodiment of this application.

As shown in FIG. 5A, when the foldable electronic device is in the folded form, a desktop of the electronic device may be displayed in the first area 301, and the second area 302 is turned off for no display. After detecting, in the first area 301, an operation of tapping an icon 501 of a camera by a user, the electronic device displays a GUI shown in FIG. 5B.

Figure 5B:
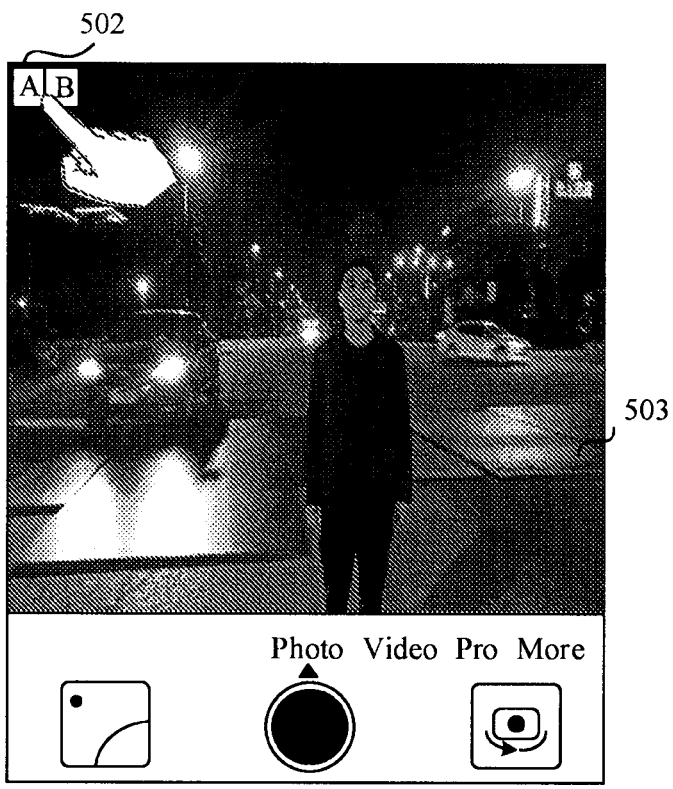
Figure 5B:
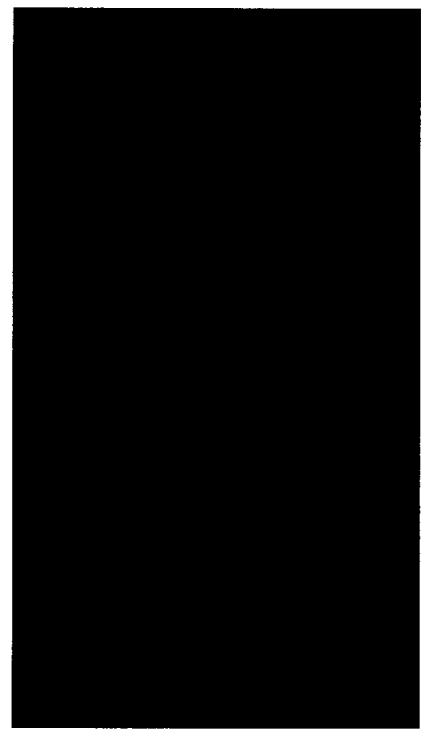

As shown in FIG. 5B, after detecting the operation of tapping the icon 302 of the camera application (APP) on the desktop by the user, the mobile phone may start the camera application, the GUI displayed in the first area 301 shown in FIG. 5B may be referred to as a photographing interface (or a camera interface). The photographing interface may include a preview window 503. In a preview state, an image captured by a camera may be displayed in the preview window 503 in real time. The electronic device displays the photographing interface in the first area 301, and the second area 302 is turned off for no display. After detecting, in the first area 301, an operation of tapping a control 502 by the user, the electronic device displays a GUI shown in FIG. 5C.

Figure 5C:
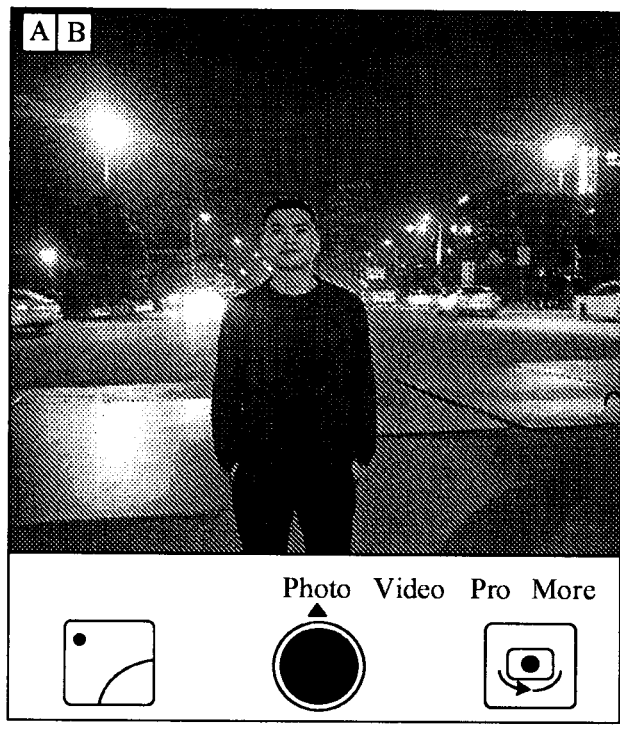
Figure 5C:
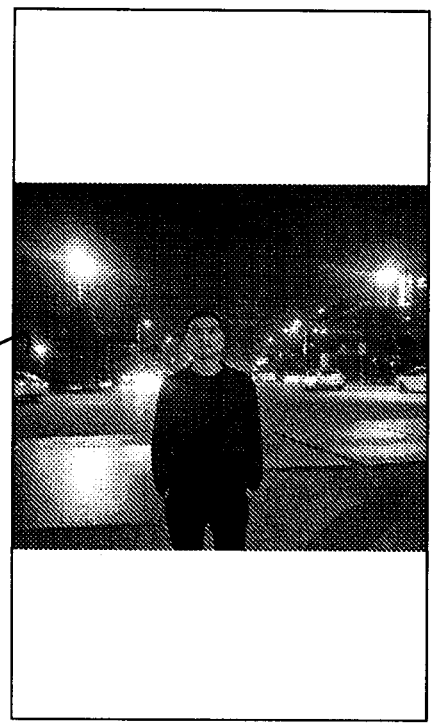

As shown in FIG. 5C, the electronic device displays the photographing interface in the first area 301, displays a preview window 504 in the second area 302, and may also display, in the preview window 504, an image captured by the camera in real time for preview. This can help a photographed person adjust a posture of the photographed person in real time based on the image in the preview window 504 in the second area 302.

For example, the electronic device may further display the preview window 504 in the second area 302 after detecting a touch and hold operation of the user in the preview window 503 in the photographing interface.

For example, after detecting a pressing operation (a pressing force is greater than or equal to a preset value) of the user in the preview window 503 in the photographing interface, the electronic device displays the preview window 504 in the second area 302.

For example, after the electronic device displays the photographing interface, if the electronic device detects a voice indication of the user, the electronic device displays the preview window 504 in the second area 302.

In an embodiment of this application, after detecting, in the photographing interface (or the camera interface), an operation of tapping the control 502 by the user, the electronic device may remind the user by using text in the photographing interface that reads "The primary screen and the sub screen simultaneously display the preview window", turn on the second area 302, and display the preview window 504 in the second area 302.

Figure 5D:
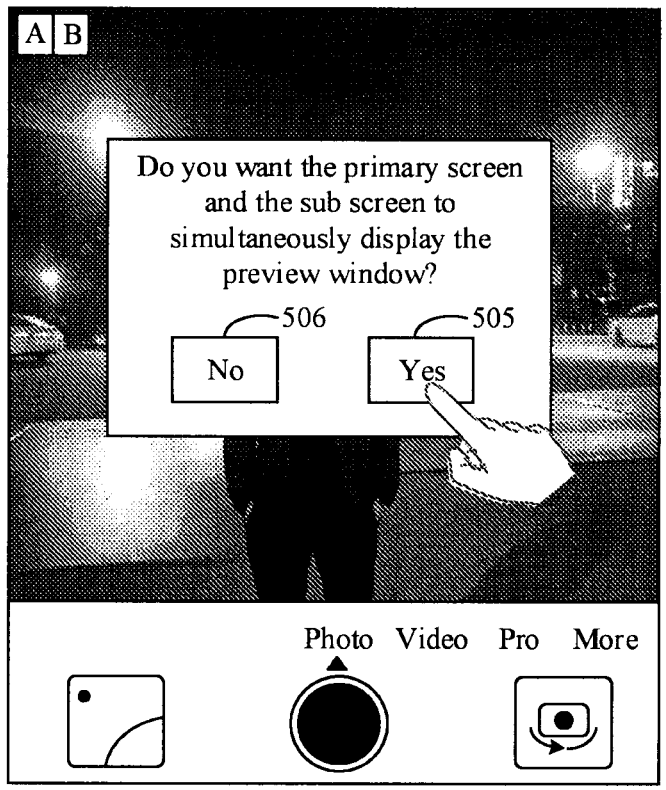
Figure 5D:
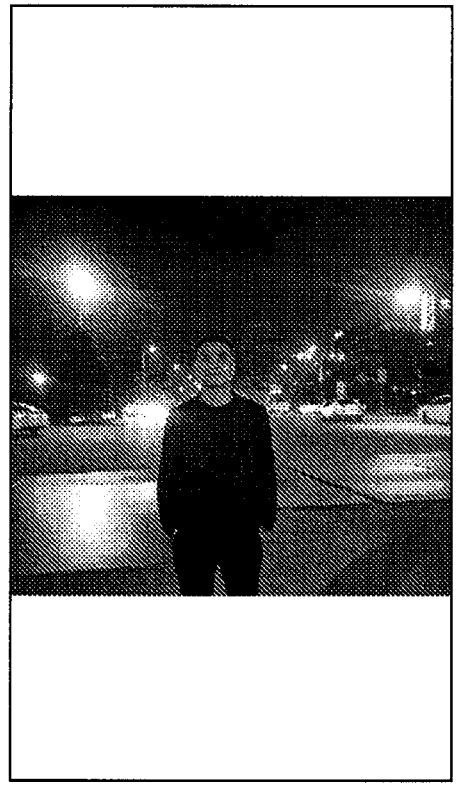

In another embodiment of this application, as shown in FIG. 5D, after detecting, in the photographing interface (or the camera interface), an operation of tapping the control 502 by the user, the electronic device may remind the user by using text in the photographing interface that reads "Do you want the primary screen and the sub screen to simultaneously display the preview window?", and display a control 505 and a control 506. After the electronic device detects an operation of tapping the control 505 by the user, the electronic device turns on the second area 302, and displays the preview window 504 in the second area 302.

In this embodiment of this application, the electronic device enters a collaborative mode during photographing, that is, photographing preview windows may be displayed on a plurality of screens, thereby helping improve screen utilization. In addition, this can help a photographed object adjust a photographing posture in time, thereby helping improve user experience.

In another embodiment of this application, as shown in FIG. 5B, when detecting, in the photographing interface (or the camera interface), that the user taps a "video" control, the electronic device may enter a video photographing interface. The video photographing interface may include a preview window and a photographing control. In this case, the second area 302 is turned off for no display. After detecting an operation of tapping the control 502 by the user, the electronic device may display the video photographing interface in the first area, and display the preview window of the video photographing interface in the second area.

In another embodiment of this application, when the electronic device is in the folded state, the electronic device may turn on the first area 301, and display the desktop of the electronic device in the first area 301, and the second area 302 is turned off for no display. After detecting, in the first area 301, an operation of tapping the camera icon 501 by the user, the electronic device may directly display the photographing interface in the first area 301, and display the preview window in the second area 302.

In this embodiment of this application, when entering the camera application in the folded form, the electronic device may simultaneously display the photographing interface in the first area, and display the preview window in the second area. This helps improve screen utilization, and does not require a manual operation by a user, thereby helping improve user experience.

In another embodiment of this application, when the electronic device is in the folded form, the electronic device displays the camera interface in the first area 301, and the second area 302 is turned off for no display. After detecting, in the first area 301, an operation of tapping the control 502 by the user, the electronic device may display the camera interface in the first area, and play an animation in the second area. In this way, during photographing of a child, attention of the child may be drawn, so that a photograph or a video that is satisfactory to the user is photographed.

The foregoing describes a group of GUIs in the embodiments of this application with reference to FIG. 5A to FIG. 5D, and mainly shows a process in which the user enables cooperative work between the first area 301 and the second area 302 by clicking a control. The following describes, with reference to another group of GUIs shown in FIG. 6A and FIG. 6B, a process in which the electronic device exits cooperative work between the first area 301 and the second area 302.

Figure 6A:
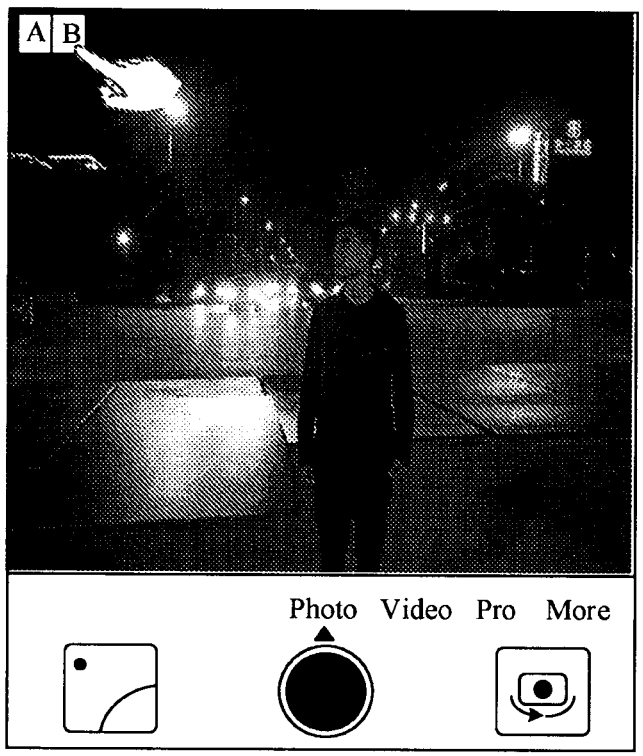
FIG. 6A and FIG. 6B are schematic diagrams of another group of display interfaces according to an embodiment of this application.
Figure 6A:
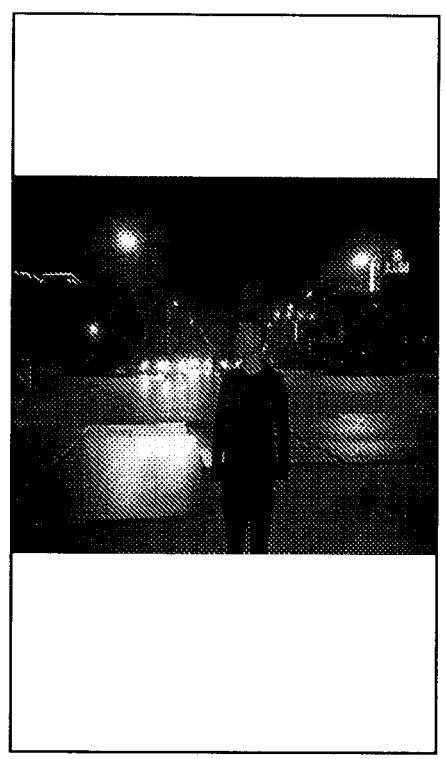

Referring to a GUI shown in FIG. 6A, after photographing ends, a user may tap the control 502 in the first area 301. After detecting an operation of tapping the control 402 by the user, the electronic device displays the GUI shown in FIG. 6B.

Figure 6B:
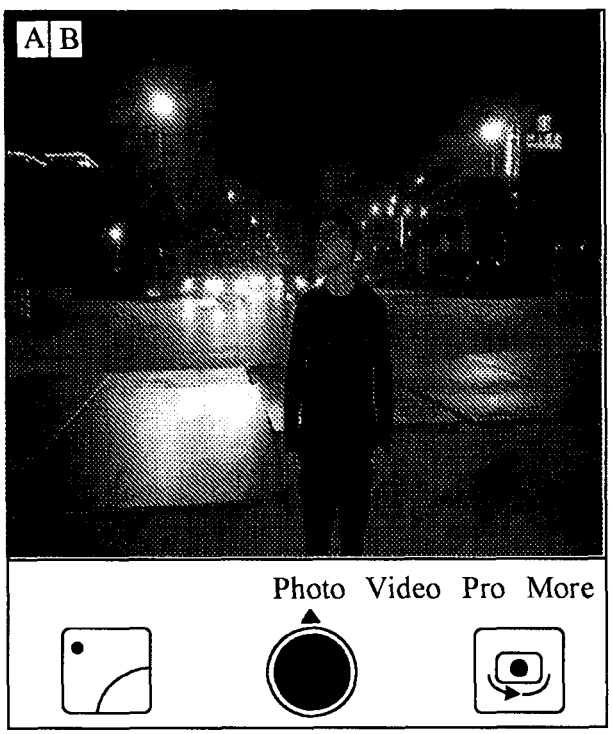
Figure 6B:

Referring to a GUI shown in FIG. 6B, the electronic device displays the photographing interface in the first area 301, and the second area 302 is turned off for no display.

Figure 7A:
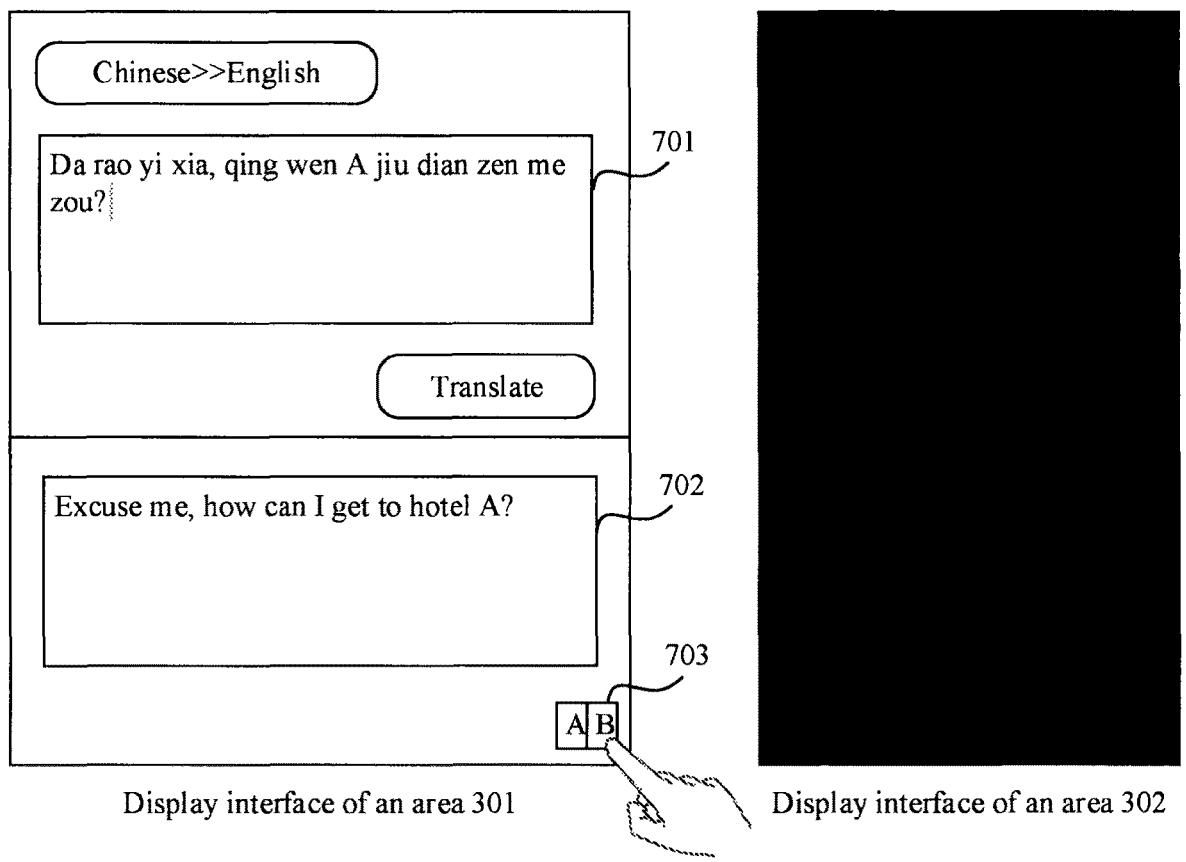
FIG. 7A to FIG. 7C are schematic diagrams of another group of display interfaces according to an embodiment of this application.
Figure 7B:
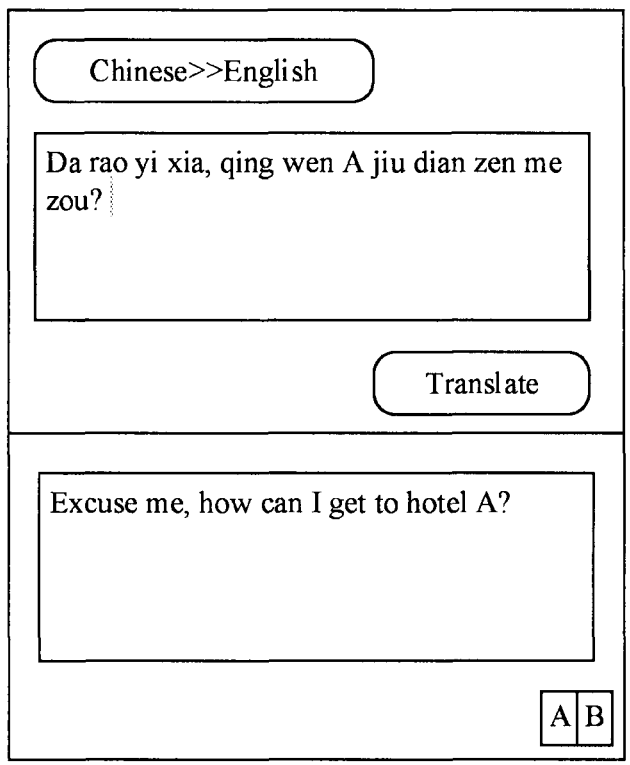
Figure 7B:
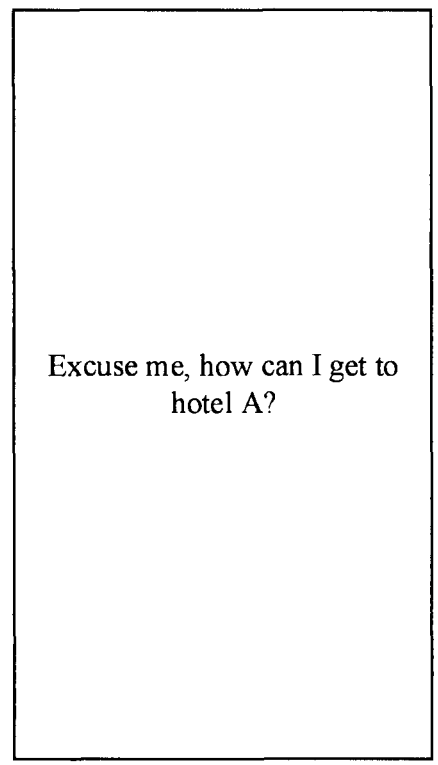
Figure 7C:
Figure 7C:
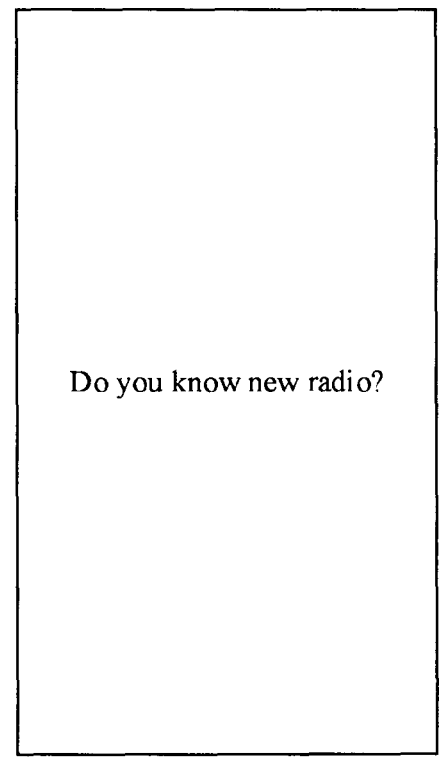

FIG. 7A to FIG. 7C show a group of GUIs in another scenario according to an embodiment of this application.

Referring to a GUI shown in FIG. 7A, when the foldable electronic device is in the folded form, a translation interface of a translation app is displayed in the first area 301, and a user may enter to-be-translated Chinese in an input box 701 in the first area 301. For example, the user enters "Da rao yi xia, qing wen A jiu dian zen me zou?" in the input box 701. When a mobile phone detects that the user taps a "Translate" control, a corresponding translation in English (for example, "Excuse me, how can I get to hotel A?") may be displayed in an output box 702. In this case, the second area 302 is turned off for no display.

After detecting an operation of tapping a control 703 by the user, the electronic device displays a GUI shown in FIG. 7B.

Referring to the GUI shown in FIG. 7B, the translation interface continues to be displayed in the first area 301, and a corresponding translation in English may be displayed in the second area 302.

In another embodiment of this application, the translation interface of the translation app may further include a control 704. When finding that a translation result that is inaccurate, a user may tap the control 704, and then modify the translation result in the output box 703.

For example, as shown in FIG. 7C, after detecting that the user enters "Ni zhi dao xin wu xian ji shu ma?" in the input box 701 and detecting that the user taps the "Translate" control, the electronic device may display a corresponding translation in English (for example, a translation result of the translation app is "Do you know the new wireless technology") in the output box 702. The "xin wu xian ji shu" is a technical term in the fifth generation mobile communications technology (5G), and should be translated as "new radio".

The user may modify the translation result. When the electronic device detects an operation of tapping the control 704 by the user, and detects that the user modifies the corresponding translation result in the output box 702, the electronic device may display the translation result considered to be accurate by the user in the second area. For example, "Do you know new radio?" may be displayed in the second area 302.

In this embodiment of this application, after the user completes translation of to-be-translated content, the collaborative mode is entered, and translated content may be displayed in the second area, thereby helping improve screen utilization. In addition, this can improve efficiency of communication in a foreign language by the user, thereby improving user experience.

Figure 8A:
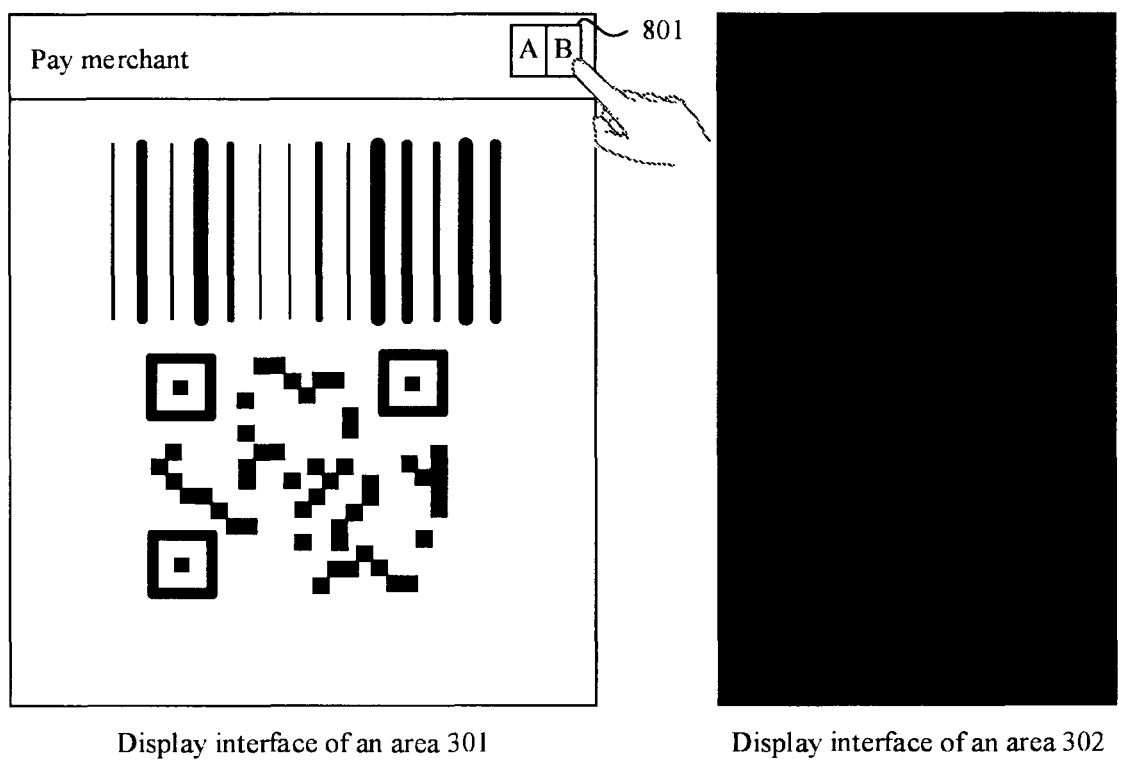
FIG. 8A and FIG. 8B are schematic diagrams of another group of display interfaces according to an embodiment of this application.
Figure 8B:
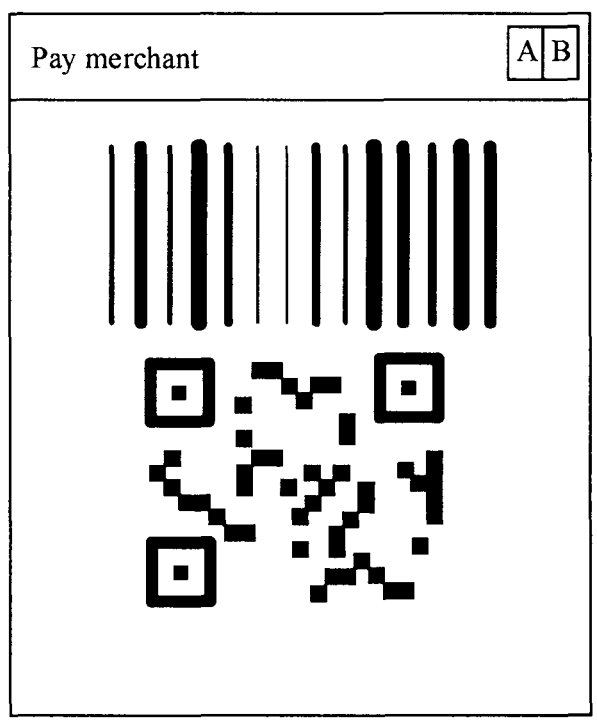
Figure 8B:
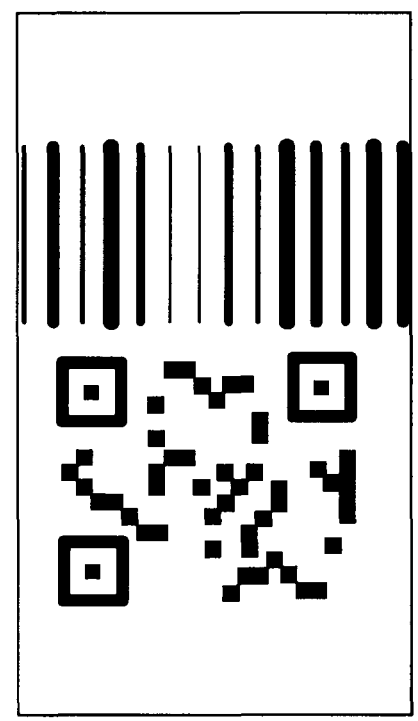

FIG. 8A and FIG. 8B show another group of GUIs according to an embodiment of this application.

Referring to the GUI shown in FIG. 8A, when the foldable electronic device is in the folded form, the electronic device displays, in the first area 301, a bar code and a two-dimensional code that are used to pay a merchant, and the second area 302 is turned off for no display. After detecting an operation of tapping a control 801 by a user, the electronic device may display a GUI shown in FIG. 8B.

Referring to the GUI shown in FIG. 8B, the electronic device may display the barcode and the two-dimensional code in both the first area 301 and the second area 302.

In this embodiment of this application, when the user pays by using the barcode or the two-dimensional code, the barcode or the two-dimensional code may be displayed in the second area, thereby helping improve screen utilization. In addition, the user does not need to flip the electronic device, thereby facilitating scanning by a merchant, and helping improve user experience.

Figure 9A:
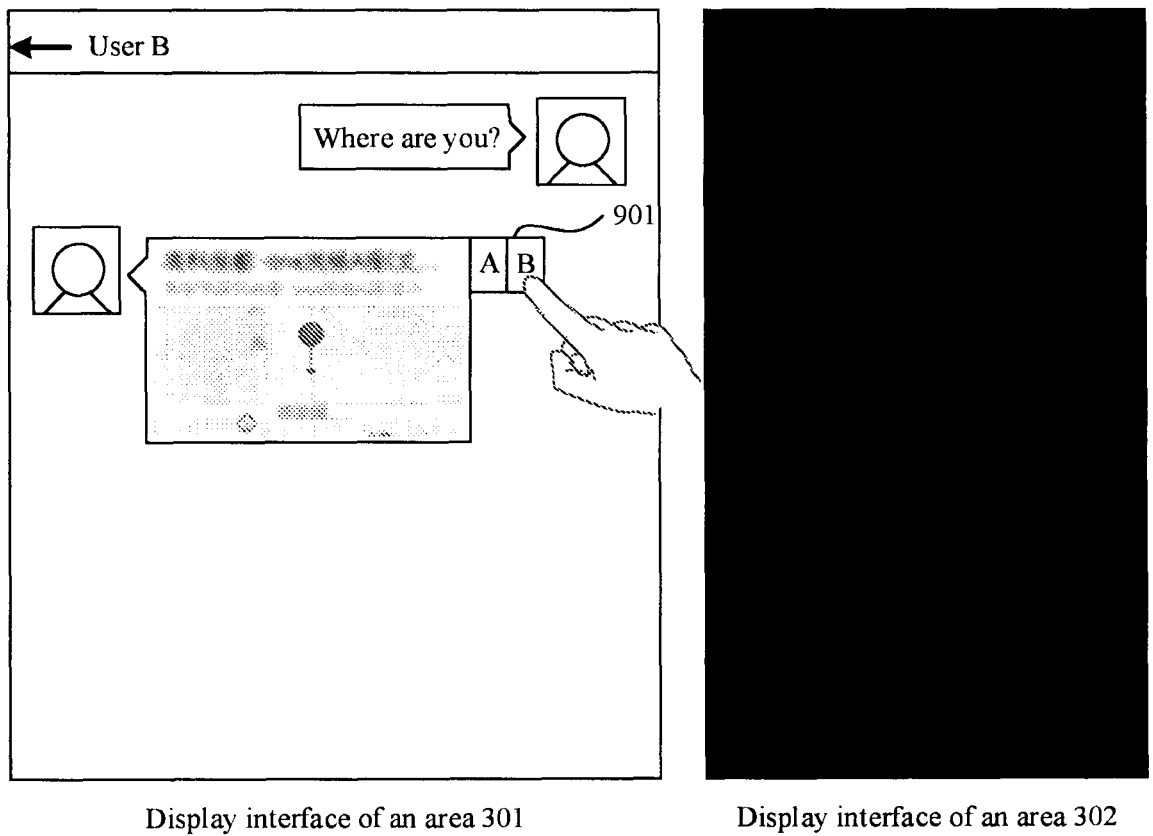
FIG. 9A and FIG. 9B are schematic diagrams of another group of display interfaces according to an embodiment of this application.
Figure 9B:
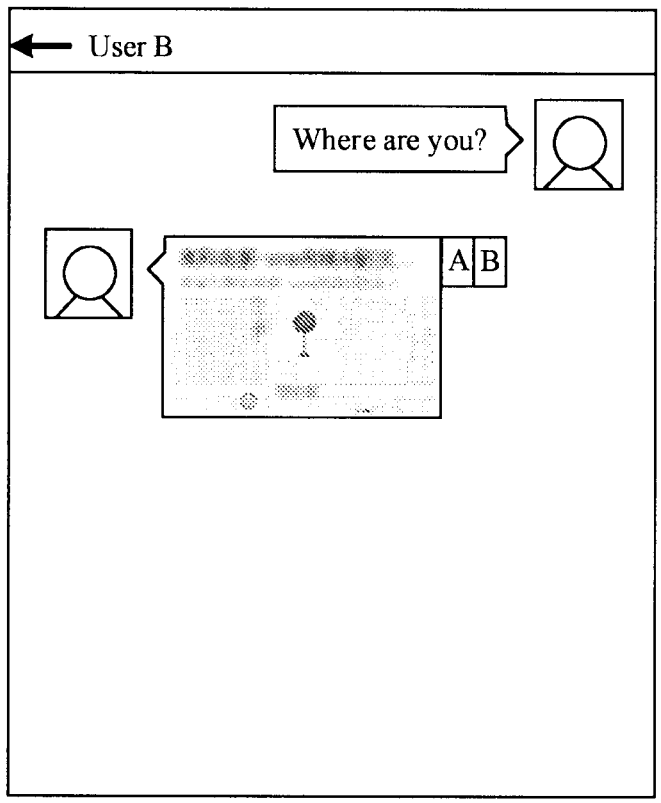
Figure 9B:
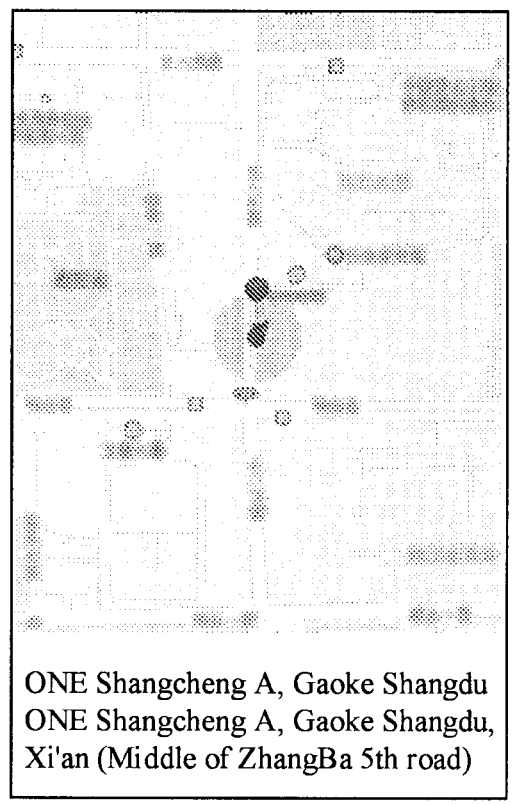

FIG. 9A and FIG. 9B show another group of GUIs according to an embodiment of this application.

Referring to the GUI shown in FIG. 9A, when the foldable electronic device is in the folded form, the electronic device displays, in the first area 301, a chat interface of a user A and a user B, and the second area 302 is turned off for no display. The user A sends a message "Where are you?" to the user B, and the electronic device receives location information sent by the user B.

After detecting an operation of tapping a control 901 by a user, the electronic device may display a GUI shown in FIG. 9B.

Referring to the GUI shown in FIG. 9B, the electronic device may display a chat interface of the user and another user in the first area 301, and open a map app in the second area 302 to display the location information.

In an embodiment, a user may further navigate in the map app displayed in the second area 302, so that the user can chat with another user on the chat app displayed in the first area 301, and view a route from a current location to a destination location on the map app displayed in the second area 302.

In this embodiment of this application, when the electronic device is in a foldable form, an operation of a user is detected in the first area, so that different applications are displayed in the first area and the second area. This helps improve screen utilization, meet different requirements of the user, and help improve user experience.

The following describes the technical solutions in the embodiments of this application by using a group of two-dimensional electronic device interfaces.

Figure 10A:
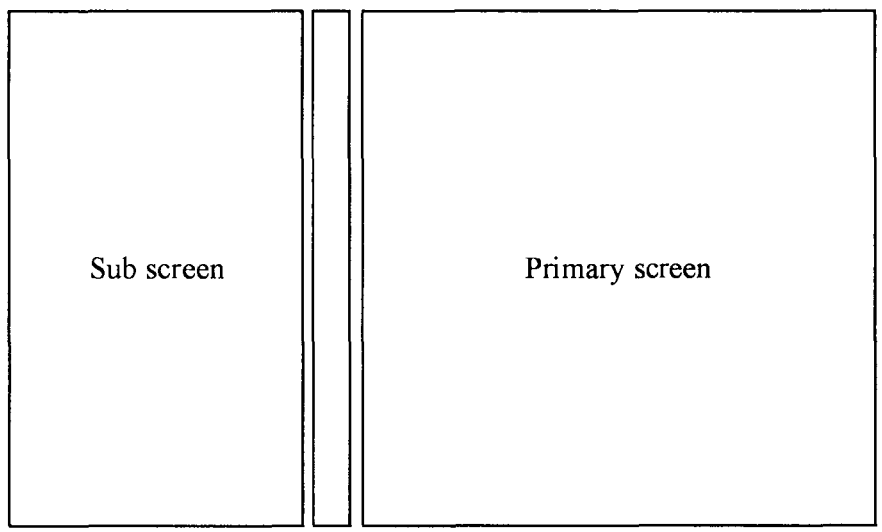
FIG. 10A and FIG. 10B are a schematic diagram of a primary screen and a sub screen of an electronic device in an unfolded state and a folded state according to an embodiment of this application.
Figure 10B:
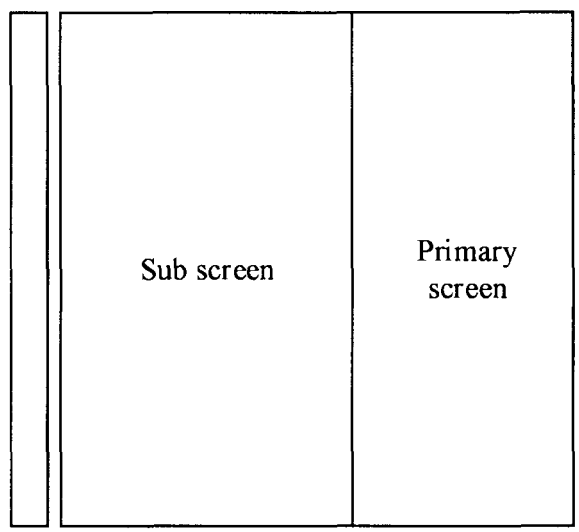

The embodiments of this application are applicable to a foldable electronic device. When the foldable electronic device in a folded state, a touchscreen may include a primary screen, a side screen, and a sub screen, and a screen resolution of the primary screen may be greater than or equal to a screen resolution of the sub screen. FIG. 10A and FIG. 10B are a schematic diagram of a primary screen and a sub screen of an electronic device in an unfolded state and a folded state.

FIG. 10A is a schematic diagram of the primary screen and the sub screen of the electronic device in the unfolded state.

FIG. 10B is a schematic diagram of the primary screen and the sub screen of the electronic device in the folded state.

Figure 11A:
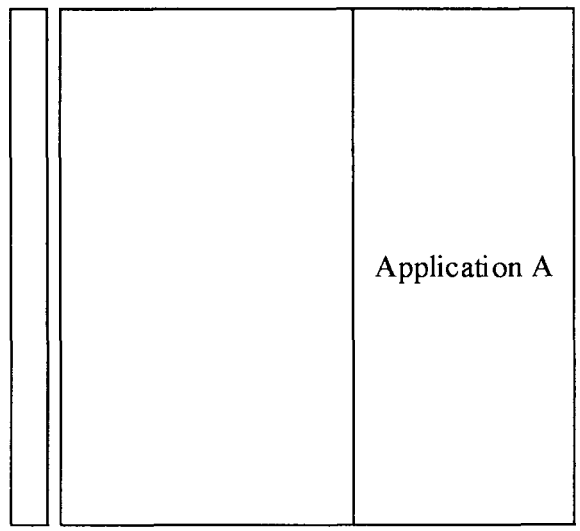
FIG. 11A and FIG. 11B are a schematic diagram of display on a primary screen and a sub screen of an electronic device in a folded state according to an embodiment of this application.
Figure 11B:
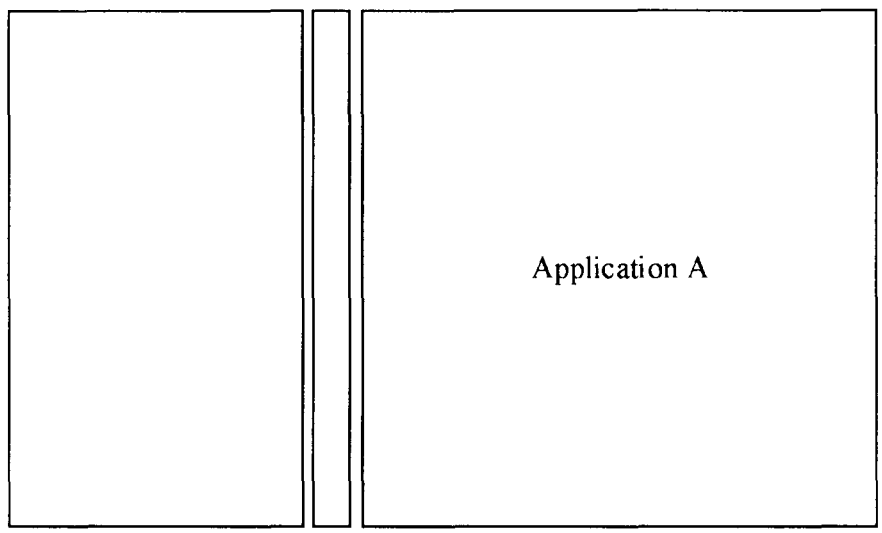

FIG. 11A and FIG. 11B are a schematic diagram of display on a primary screen and a sub screen of an electronic device in a folded state.

FIG. 11A shows that an application A may be displayed on the primary screen in the folded state, and the sub screen is turned off for no display.

FIG. 11B is a schematic diagram of display on the primary screen and the sub screen that are viewed from an unfolded angle of the electronic device in the folded state.

The application A is displayed on the primary screen. In this case, an available area of the screen is a size occupied by the primary screen. The sub screen is turned off for no display.

When the electronic device actively enters a collaborative mode by invoking an API provided by a system, or when the electronic device detects that a user taps a control in an interface of the application A on the primary screen, the electronic device performs, in response to the tap operation, the collaborative mode and displays an application B on the sub screen.

Figure 12A:
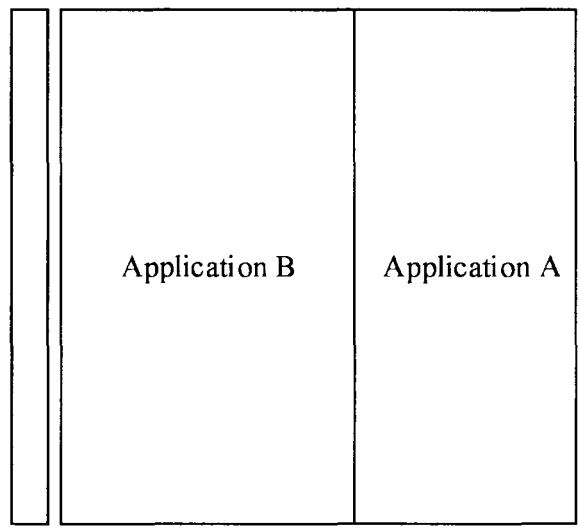
FIG. 12A and FIG. 12B are another schematic diagram of display on a primary screen and a sub screen of an electronic device in a folded state according to an embodiment of this application.
Figure 12B:
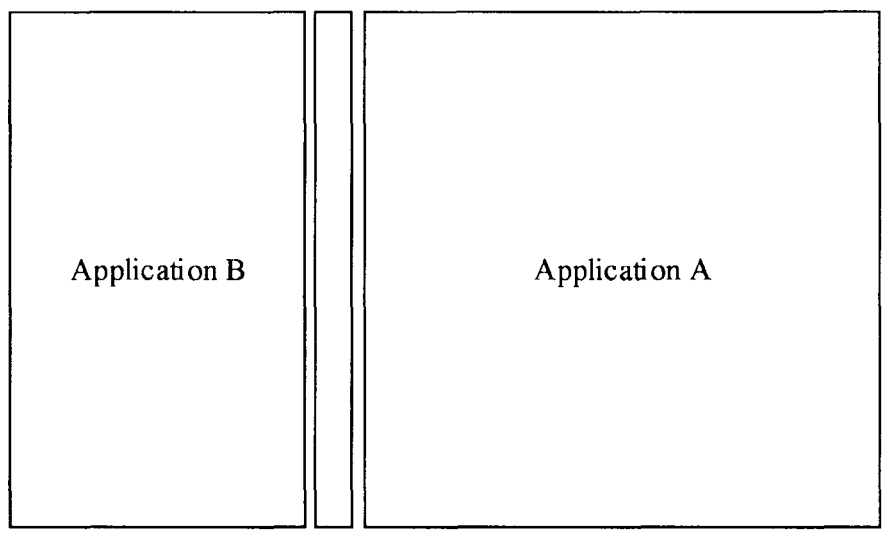

FIG. 12A and FIG. 12B are another schematic diagram of display on a primary screen and a sub screen of an electronic device in a folded state.

FIG. 12A is a schematic diagram of display on the primary screen and the sub screen that are viewed from an unfolded angle of the electronic device in the folded state. When the electronic device enters a collaborative mode, an application A is displayed on the primary screen, and an application B is displayed on the sub screen. In this case, an available area of a screen is a size of the screen that is unfolded. The electronic device needs to adjust a location of the application A to a location on a right side of the screen in an unfolded state, and the newly started application B is displayed at a location on a screen other than the primary screen and a side screen.

It should be understood that when the electronic device is in an unfolded form or a half-folded form, the display service management module may notify the LCD module of an area that needs to be turned on, and an actual display area of the touchscreen is the entire touchscreen.

When the electronic device is in the folded form, the display management module may notify the LCD module of the area that needs to be turned on, and the LCD module adjusts the actual display area of the touchscreen to a size of the primary screen.

When the electronic device is in the folded form, and the electronic device detects, on the primary screen, an operation of tapping the primary screen and the sub screen by the user for cooperative work, the display management module may notify the LCD module of the area that needs to be turned on, and the LCD module adjusts the actual display area of the touchscreen to a size of the entire touchscreen. In this case, the side screen may be working but not displayed. A method for controlling, by the electronic device, the side screen to work but not to be displayed includes but is not limited to: covering, by the window manager service, the side screen by using a black background. Optionally, a control (or a shortcut or the like) may be set on the side screen. After detecting an operation of tapping a control by the user in the third area, the electronic device turns on the third area (or the side screen).

It should be further understood that, before the collaborative mode is entered, an available area of the screen of the electronic device is a screen B. After the collaborative mode is entered, a size of an available screen of the electronic device is a size of the entire screen unfolded. In this case, the window manager service may adjust a display location of the screen B on the same unfolded screen.

For example, before the collaborative mode is entered, because a screen A is turned off and does not work, coordinates of an upper left corner of the screen B in the entire screen may be (0, 0). After the electronic device enters the collaborative mode, because the application A is displayed on the screen A, the coordinates of the upper left corner of screen B in the entire screen may be (k, 0), where k may be a width of the screen A. Similarly, horizontal coordinates of all points on the screen B are increased by k.

FIG. 12B is a schematic diagram of display on the screen A and the screen B that are viewed from an unfolded angle of the electronic device in the folded state.

When the electronic device exits the collaborative mode by using the API provided by the system, or the electronic device exits the collaborative mode after detecting an operation of tapping a control by the user, the application B may be removed from the sub screen, and the sub screen is turned off for no display.

In this embodiment of this application, screen utilization can be improved in the folded state, more content can be displayed, and additional interface content can be displayed without covering current screen content, thereby helping improve user experience.

The foregoing describes, with reference to FIG. 3A to FIG. 12B, GUIs for cooperative work between the first area and the second area of the electronic device in the folded form. The following describes a process of measuring an angle between the first area and the second area in an embodiment of this application.

In a possible implementation, one gyroscope sensor may be deployed in each of the first area and the second area. The electronic device may obtain the angle between the first area and the second area through measurement by using the gyroscope sensors deployed in the first area and the second area.

Figure 13:
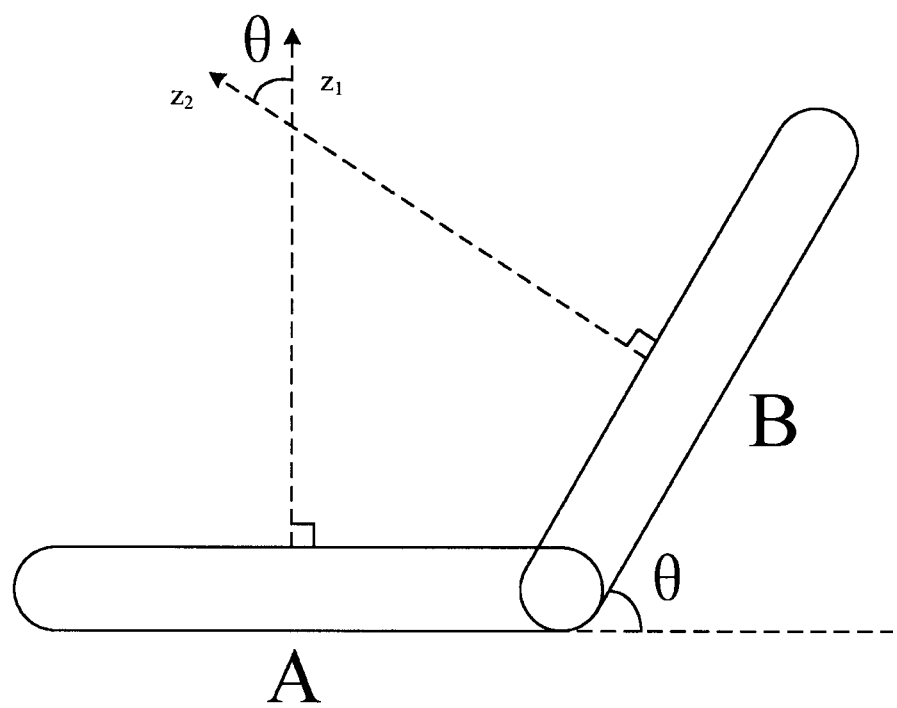
FIG. 13 is another schematic diagram of a foldable electronic device according to an embodiment of this application.

FIG. 13 is a schematic diagram of another example of a foldable electronic device according to an embodiment of this application. As shown in FIG. 13, the electronic device detects that a user folds the electronic device towards a direction in which a screen A and a screen B face each other. Directions of the screen A and the screen B are respectively $z_1$ and $z_2$, and an angle $\theta$ at which the foldable electronic device is folded is an angle between $z_1$ and $z_2$.

In this embodiment of this application, the direction of $z_1$ may be determined by using a gyroscope sensor deployed on the screen A, and the direction of $z_2$ may be determined by using a gyroscope sensor deployed on the screen B, to finally obtain an angle $\theta$ between $z_1$ and $z_2$.

It should be understood that a coordinate system of the gyroscope sensor is a geographic coordinate system: The gyroscope sensor is used as an origin, a direction due east is an x-axis direction, a direction due north is a y-axis direction, and a direction opposite to an earth plumb line is a z-axis direction.

Figure 14:
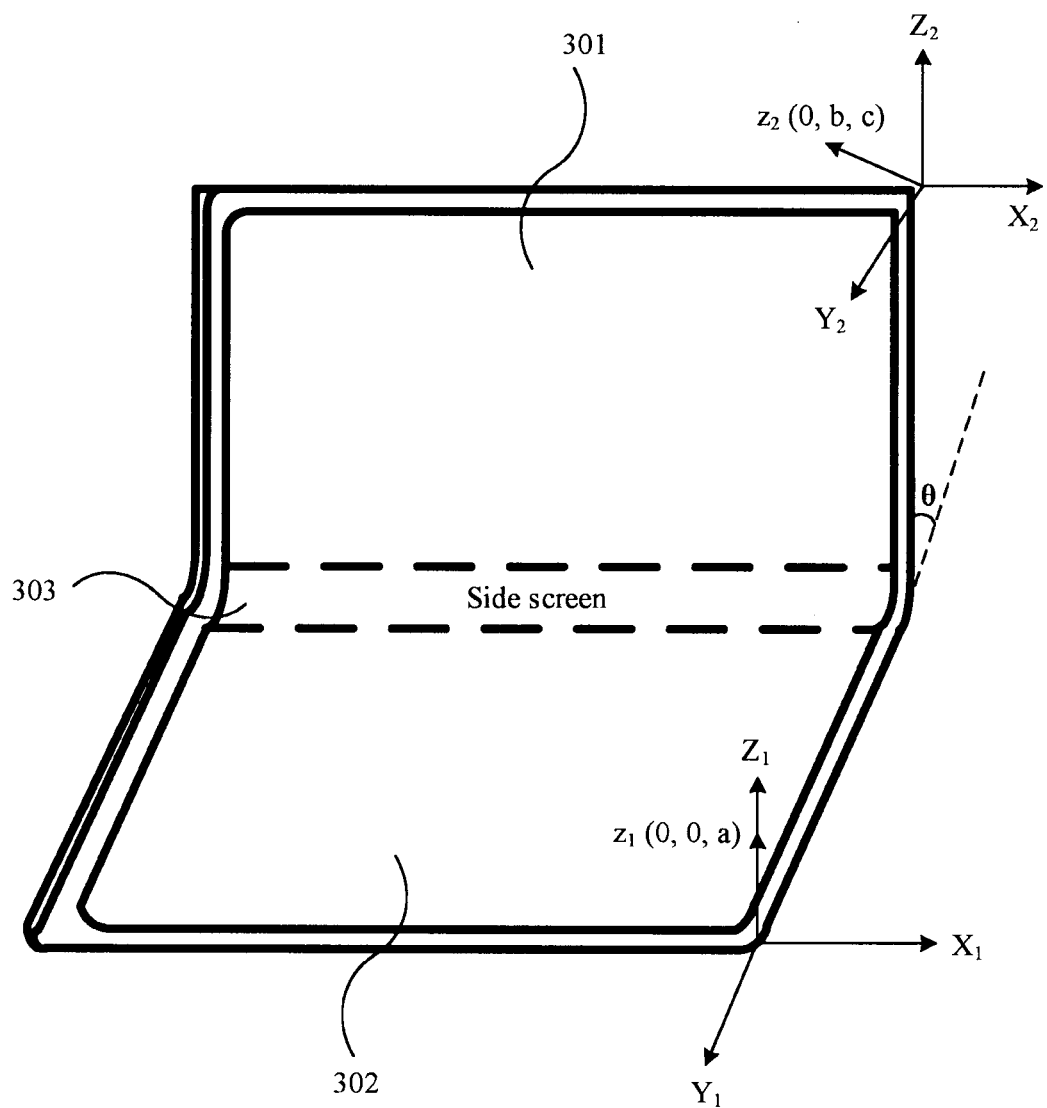
FIG. 14 is another schematic diagram of a foldable electronic device according to an embodiment of this application.

FIG. 14 is a schematic diagram of another example of a foldable electronic device according to an embodiment of this application. Coordinate systems of gyroscope sensors on a screen A and a screen B are respectively $X_1$-$Y_1$-$Z_1$ and $X_2$-$Y_2$-$Z_2$. Although origins of the gyroscope sensors in the screen A and the screen B do not overlap, X, Y, and Z axes of the two coordinate systems may be considered parallel. Therefore, the gyroscope coordinate systems in the screen A and the screen B may be considered parallel.

The angle $\theta$ at which the foldable electronic device is folded may be determined as follows:

Step 1: Obtain vector data of directions of the screen A and the screen B, where a direction of the screen A is represented by using a vector $z_1$, and a direction of the screen B may be represented by using a vector $z_2$.

For example, as shown in FIG. 14, data of the vector $z_1$ is (0, 0, a), and data of the vector $z_2$ is (0, b, c).

It should be understood that the data of the vector $z_1$ and the data of the vector $z_2$ may be obtained by the gyroscope sensors.

Step 2: Calculate an angle $\theta$ between the directions of the screen A and the screen B.

The angle formed between $z_1$ and $z_2$ is $\theta$. Although $z_1$ and $z_2$ are not in a same coordinate system, because the coordinate systems in which $z_1$ and $z_2$ are located are parallel, the angle $\theta$ may be calculated by using formula (1):

$$Z_1 \cdot Z_2 = |Z_1| \cdot |Z_2| \cos\theta \tag{1}$$

In this case, a formula for calculating the angle $\theta$ is formula (2):

$$\theta = \arccos\frac{c}{\sqrt{b^2+c^2}} \tag{2}$$

In a possible implementation, one acceleration sensor and one gravity sensor may be deployed in the first area, and one acceleration sensor and one gravity sensor may be deployed in the second area. The electronic device may determine, by using the acceleration sensors and the gravity sensors deployed in the first area and the second area, whether the first area and the second area are folded opposite to each other or facing each other, and may obtain the angle between the first area and the second area through measurement.

In this application, the electronic device may be folded only in a method in which the first area and the second area are opposite to each other, or may be folded in either a method in which the first area and the second area are opposite to each other or a direction in which the first area and the second area face each other.

When the electronic device can be folded in either the direction in which the first area and the second area are opposite to each other or the direction in which the first area and the second area face each other, an angle sensor may be deployed in a third area (side screen). When a user folds the electronic device, a direction in which the electronic device is folded may be detected by using the angle sensor.

Figure 15:
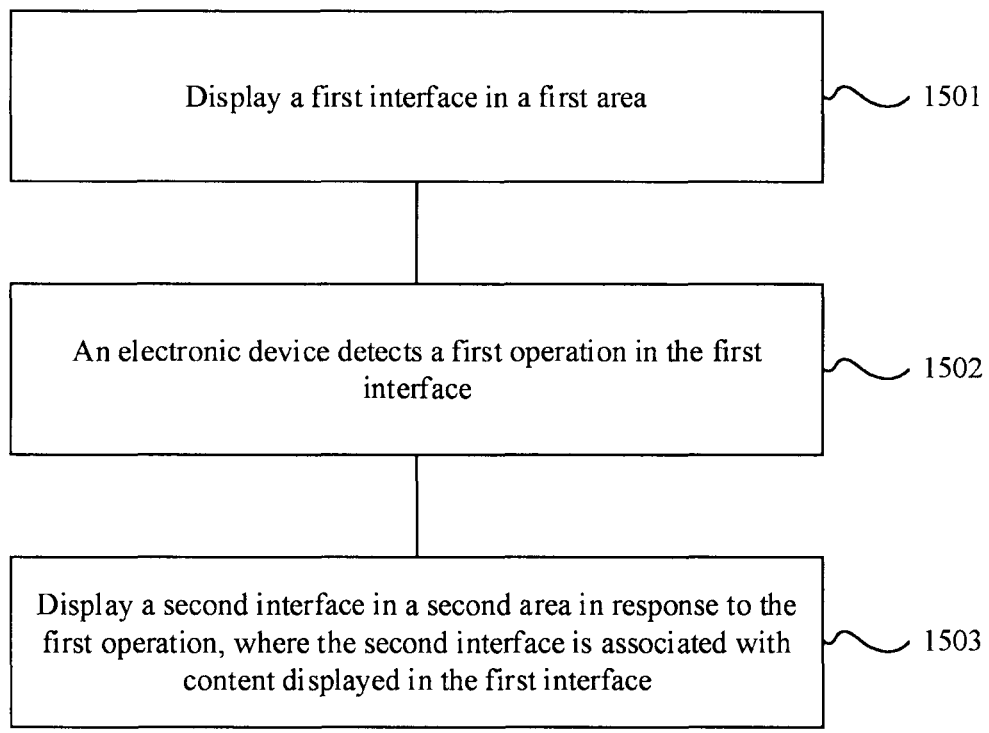
FIG. 15 is a schematic flowchart of a screen display control method according to an embodiment of this application.

With reference to the foregoing embodiments and related accompanying drawings, an embodiment of this application provides a screen display control method. The method may be implemented in the electronic device (for example, a mobile phone or a tablet computer) having a foldable touchscreen shown in FIG. 1 and FIG. 2. As shown in FIG. 15, the method may include the following steps.

S1501: The electronic device displays a first interface in the first area.

For example, as shown in FIG. 5B, the electronic device displays a photographing interface (or a camera interface) in the area 301.

For example, as shown in FIG. 7A, the electronic device displays a translation interface in the area 301.

For example, as shown in FIG. 8A, the electronic device displays a payment interface in the area 301.

For example, as shown in FIG. 9A, the electronic device displays, in the area 301, a chat interface with a user B.

S1502: The electronic device detects a first operation in the first interface.

For example, as shown in FIG. 5B, the first operation may be that the electronic device detects, in the camera interface, an operation of tapping the control 502 by a user.

For example, as shown in FIG. 7A, the first operation may be that the electronic device detects, in the translation interface, an operation of tapping the control 703 by a user.

For example, as shown in FIG. 8A, the first operation may be that the electronic device detects, in the payment interface, an operation of tapping the control 801 by a user.

For example, as shown in FIG. 9A, the first operation may be that the electronic device detects, in the chat interface, an operation of tapping the control 901 by a user.

For example, the first operation may further be a touch and hold operation, a pressing operation, a voice indication operation, or the like detected by the electronic device in the foregoing interfaces.

S1503: Display a second interface in the second area in response to the first operation, where the second interface is associated with content displayed in the first interface.

For example, as shown in FIG. 5C, the electronic device may display the preview window 504 in the second area 302. Content displayed in the preview window 504 may be the same as image information displayed in the preview window 503 in the first area 503. Alternatively, a part of image information in the preview window 503 may be displayed in the preview window 504.

For example, an aspect ratio displayed on the preview window 503 is 4:3. An aspect ratio displayed in the preview window 504 is 4:3, or an aspect ratio displayed in the preview window 504 is 3:3.

For example, as shown in FIG. 7B, the electronic device may display, in the area 302, a translation result of to-be-translated content in the area 301.

For example, as shown in FIG. 8B, the electronic device may display, in the area 302, a payment code in the area 301. For example, the payment code may include a bar code and/or a two-dimensional code.

For example, as shown in FIG. 9B, the electronic device may display, in the area 302, a map display interface of a map app, and the map display interface may display detailed location information in the area 301.

Optionally, that the electronic device displays a first interface in the first area includes:

The electronic device determines that the electronic device is in a folded form.

The electronic device displays the first area in the first area in response to being in the folded form, and the electronic device turns off the second area.

It should be understood that, for a process in which the electronic device detects an angle between the first area and the second area and determines that the electronic device is in the folded form, reference may be made to the descriptions in the foregoing embodiments. For brevity, details are not described herein again.

For example, as shown in FIG. 5B, when the electronic device is in the folded form, the electronic device displays the camera interface in the area 301, and the area 302 is turned off for no display.

For example, as shown in FIG. 7A, when the electronic device is in the folded form, the electronic device displays the translation interface in the area 301, and the area 302 is turned off for no display.

For example, as shown in FIG. 8A, when the electronic device is in the folded form, the electronic device displays the payment interface in the area 301, and the area 302 is turned off for no display.

For example, as shown in FIG. 9A, when the electronic device is in the folded form, the electronic device displays the chat interface in the area 301, and the area 302 is turned off for no display.

Optionally, after the electronic device displays the second interface in the second area, the method further includes:

The electronic device detects a second operation in the first interface.

The electronic device turns off the second area in response to the second operation.

For example, as shown in FIG. 6A, the second operation may be an operation of tapping the control 502 by the user that is detected by the electronic device. After detecting the operation of tapping the control 502 by the user, as shown in FIG. 6B, the electronic device turns off the area 302.

It may be understood that, to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or by computer software driving hardware depends on specific applications and design constraints of the technical solution. A person skilled in the art may use different methods to implement the described functions for each specific application with reference to the embodiments, but it should not be considered that such implementation goes beyond the scope of this application.

In this embodiment, the electronic device may be divided into function modules based on the foregoing method examples. For example, each function module may be obtained through division corresponding to each function, or two or more functions may be integrated into one processing module. The integrated module may be implemented in a form of hardware. It should be noted that, division into modules in this embodiment is an example, and is merely logical function division. In actual implementation, there may be another division manner.

Figure 16:
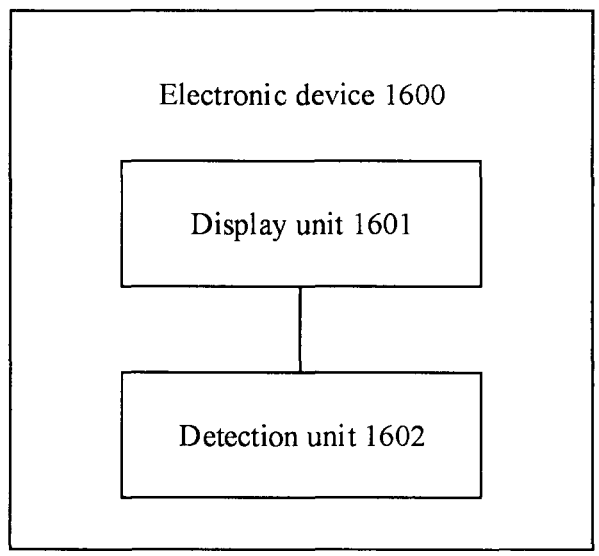
FIG. 16 is a schematic block diagram of an electronic device according to an embodiment of this application.

When each function module is obtained through division based on each corresponding function, FIG. 16 is a possible schematic composition diagram of the electronic device 1600 in the foregoing embodiment. As shown in FIG. 16, the electronic device 1600 may include a display unit 1601 and a detection unit 1602.

The display unit 1601 may be configured to support the electronic device 1600 in performing step 1501, step 1503, and the like, and/or is configured to perform another process of the technology described in this specification.

The detection unit 1602 may be configured to support the electronic device 1600 in performing the foregoing step 1502 and the like, and/or is configured to perform another process of the technology described in this specification.

It should be noted that all related content of the steps in the foregoing method embodiments may be referenced to function descriptions of corresponding functional modules, and details are not described herein again.

The electronic device provided in this embodiment is configured to execute the foregoing screen display control method, and therefore can achieve a same effect as the foregoing implementation method.

When an integrated unit is used, the electronic device may include a processing module, a storage module, and a communications module. The processing module may be configured to control and manage an action of the electronic device, for example, may be configured to support the electronic device in performing steps performed by the display unit 1601 and the detection unit 1603. The storage module may be configured to support the electronic device in executing storage program code, data, and the like. The communications module may be configured to support communication between the electronic device and another device.

The processing module may be a processor or a controller. The apparatus may implement or execute various example logical blocks, modules, and circuits described with reference to content disclosed in this application. The processor may also be a combination of implementing a computing function, for example, a combination of one or more microprocessors (digital signal processing, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor, and the storage module is a memory, the electronic device in this embodiment may be a device having a structure shown in FIG. 1.

This embodiment further provides a computer storage medium. The computer storage medium stores computer instructions. When the computer instruction runs on an electronic device, the electronic device is enabled to perform the foregoing related method steps to implement the screen display control method in the foregoing embodiment.

This embodiment further provides a computer program product. When the computer program product is run on a computer, the computer is enabled to perform the foregoing related steps, so as to implement the screen display control method in the foregoing embodiment.

In addition, an embodiment of this application further provides an apparatus. The apparatus may be specifically a chip, a component, or a module, and the apparatus may include a processor and a memory that are connected. The memory is configured to store computer-executable instructions. When the apparatus runs, the processor may execute the computer-executable instructions stored in the memory, so that the chip performs the screen display control method in the foregoing method embodiments.

The electronic device, the computer storage medium, the computer program product, or the chip provided in the embodiments are all configured to perform the corresponding method provided above. Therefore, for beneficial effects that can be achieved by the electronic device, the computer storage medium, the computer program product, or the chip, refer to beneficial effects in the corresponding method provided above. Details are not described herein again.

Based on the description of the foregoing implementations, a person skilled in the art may understand that, for ease and brevity of description, division into the foregoing functional modules is merely used as an example for description. In actual application, the foregoing functions may be allocated to different functional modules for implementation as required, that is, an internal structure of the apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces, and the indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When an integrated unit is implemented in a form of a software functional unit and sold or used as an independent product, the integrated unit may be stored in a readable storage medium. Based on such an understanding, the technical solutions in the embodiments may be embodied in a form of a software product. The software product is stored in a storage medium, and includes several instructions to enable a device (which may be a single-chip microcomputer, a chip, or the like). or a processor performs all or some steps of the methods in the embodiments of this application. The foregoing storage medium includes any medium that can store program code, such as a USB flash drive, a removable hard disk, a read-only memory (ROM), a RAM, a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of the present application shall be subject to the protection scope of the claims.

What is claimed is:

1. A method implemented by an electronic device provided with a primary screen and a secondary screen, wherein the method comprises:
    displaying a first camera interface on the primary screen while the secondary screen is in an off state, wherein the first camera interface comprises a first preview window and a photographing control;
    detecting a first operation in the first camera interface; and
    in response to the first operation, turning on the secondary screen and displaying a second interface on the secondary screen, wherein the second interface comprises a second preview window and does not comprise a photographing control; and
    simultaneously displaying a first image in the first preview window and a second image in the second preview window, wherein the second image is at least partially the same as the first image.

2. The method of claim 1, wherein after displaying the second interface on the secondary screen, the method further comprises:
    detecting a second operation on the first camera interface; and
    in response to the second operation, turning off the secondary screen.

3. The method of claim 1, wherein the first operation comprises tapping a preset control on the first camera interface.

4. The method of claim 1, wherein detecting the first operation in the first camera interface comprises detecting a tap and hold operation in the first camera interface when a pressing force greater than or equal to a preset value is applied to the first camera interface.

5. The method of claim 1, further comprising capturing, by a same camera, the first image displayed in the first preview window and the second image displayed in the second preview window.

6. The method of claim 1, wherein the electronic device is provided with a foldable touchscreen comprising the primary screen and the secondary screen, wherein the method further comprises simultaneously displaying of the first image and the second image while the electronic device is in a folded state, and wherein the primary screen and the secondary screen are located on two sides of a bending part of the foldable touchscreen.

7. The method of claim 6, wherein the primary screen and the secondary screen are folded in opposite directions.

8. The method of claim 1, wherein the second image is only a portion of the first image.

9. The method of claim 1, wherein before displaying the first camera interface on the primary screen, the method further comprises:
    displaying, on the primary screen, a desktop comprising an icon of a camera application;
    detecting, while the secondary screen is in the off state, a third operation of tapping the icon of the camera application; and
    starting, while the secondary screen is in the off state, the camera application in response to the third operation, wherein the first camera interface is a camera interface of the camera application.

10. An electronic device, comprising:
    a primary screen; and
    a secondary screen;
    a non-transitory computer readable medium configured to store computer-executable instructions; and
    a processor coupled the primary screen, the secondary screen, and the computer readable medium, wherein the processor is configured to execute the computer-executable instructions to enable the electronic device to:
        display a first camera interface on the primary screen while the secondary screen is in an off state, wherein the first camera interface comprises a first preview window and a photographing control;
        detect a first operation in the first camera interface;
        in response to the first operation, turn on the secondary screen;
        display, in response to the first operation, a second interface on the secondary screen, wherein the second interface comprises a second preview window and does not comprise a photographing control; and
        simultaneous display a first image in the first preview window and a second intra in the second preview window, wherein the second image is at least partially the same as the first image.

11. The electronic device of claim 10, wherein after displaying the second interface on the secondary screen, the processor is further configured to execute the computer-executable instructions to enable the electronic device to:
    detect a second operation on the first camera interface; and
    in response to the second operation, turn off the secondary screen.

12. The electronic device of claim 10, wherein the first operation comprises tapping a preset control on the first camera interface.

13. The electronic device of claim 10, wherein the processor is further configured to execute the computer-executable instructions to enable the electronic device to capture, by a same camera, the first image displayed in the first preview window and the second image displayed in the second preview window.

14. The electronic device of claim 10, wherein the electronic device is provided with a foldable touchscreen comprising the primary screen and the secondary screen, wherein the electronic device is in a folded state, and wherein the primary screen and the secondary screen are located on two sides of a bending part of the foldable touchscreen.

15. The electronic device of claim 14, wherein the primary screen and the secondary screen are folded in opposite directions.

16. The electronic device of claim 10, wherein the second image displayed in the second preview window is a portion of the first image displayed in the first preview window.

17. The electronic device of claim 10, wherein the primary screen is larger than the secondary screen.

18. The electronic device of claim 10, wherein before displaying the first camera interface on the primary screen, the processor is further configured to execute the computer-executable instructions to enable the electronic device to:
    display, on the primary screen, a desktop comprising an icon of a camera application;
    detect, while the secondary screen is in the off state, a third operation of tapping the icon of the camera application; and
    start, while the secondary screen is in the off state, the camera application in response to the third operation, wherein the first camera interface is a camera interface of the camera application.

19. A computer storage medium, comprising computer instructions, wherein when the computer instructions are run on an electronic device provided with a primary screen and a secondary screen, the electronic device is enabled to:
- display a first camera interface on the primary screen while the secondary screen is in an off state, wherein the first camera interface comprises a first preview window and a photographing control;
- detect a first operation in the first camera interface;
- in response to the first operation, turn on the secondary screen and displaying a second interface on the secondary screen, wherein the second interface comprises a second preview window and does not comprise a photographing control; and
- simultaneously display a first image in the first preview window and a second image in the second preview window, wherein the second image is at least partially the same as the first image.

20. The computer storage medium of claim 19, wherein before displaying the first camera interface on the primary screen, the electronic device is enabled to:
- display, on the primary screen, a desktop comprising an icon of a camera application;
- detect, while the secondary screen is in the off state, a third operation of tapping the icon of the camera application; and
- start, while the secondary screen is in the off state, the camera application in response to the third operation, wherein the first camera interface is a camera interface of the camera application.

\* \* \* \* \*

UNITED STATES PATENT AND TRADEMARK OFFICE
CERTIFICATE OF CORRECTION

PATENT NO. : 11,829,599 B2
APPLICATION NO. : 18/184861
DATED : November 28, 2023
INVENTOR(S) : Xiaoxiao Chen et al.

It is certified that error appears in the above-identified patent and that said Letters Patent is hereby corrected as shown below:

In the Claims

Claim 10, Column 28, Line 17: "simultaneous display a" should read "simultaneously display a"

Claim 10, Column 28, Line 18: "second intra in" should read "second image in"

Signed and Sealed this
Ninth Day of January, 2024

Katherine Kelly Vidal
*Director of the United States Patent and Trademark Office*